(12) United States Patent
Hasegawa et al.

(10) Patent No.: US 12,331,167 B2
(45) Date of Patent: Jun. 17, 2025

(54) RESIN MODIFIER, RESIN COMPOSITION, MOLDING, AND MOLDED ARTICLE

(71) Applicant: SANYO CHEMICAL INDUSTRIES, LTD., Kyoto (JP)

(72) Inventors: Shimpei Hasegawa, Kyoto (JP); Yuhei Tanaka, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 1028 days.

(21) Appl. No.: 16/964,269

(22) PCT Filed: Jan. 22, 2019

(86) PCT No.: PCT/JP2019/001852
§ 371 (c)(1),
(2) Date: Jul. 23, 2020

(87) PCT Pub. No.: WO2019/146591
PCT Pub. Date: Aug. 1, 2019

(65) Prior Publication Data
US 2021/0032410 A1 Feb. 4, 2021

(30) Foreign Application Priority Data

Jan. 25, 2018 (JP) .................................. 2018-010289

(51) Int. Cl.
| | | |
|---|---|---|
| *C08G 81/02* | (2006.01) | |
| *C08L 23/00* | (2006.01) | |
| *C08L 23/12* | (2006.01) | |
| *C08L 53/00* | (2006.01) | |
| *C08L 81/02* | (2006.01) | |
| *C08L 87/00* | (2006.01) | |
| *C08L 101/00* | (2006.01) | |

(52) U.S. Cl.
CPC ......... *C08G 81/025* (2013.01); *C08G 81/021* (2013.01); *C08L 23/12* (2013.01); *C08L 2205/06* (2013.01); *C08L 2207/10* (2013.01)

(58) Field of Classification Search
None
See application file for complete search history.

(56) References Cited

U.S. PATENT DOCUMENTS

| | | | |
|---|---|---|---|
| 5,700,903 | A | 12/1997 | Hancock et al. |
| 5,911,880 | A | 6/1999 | Klein et al. |
| 6,552,131 | B1 | 4/2003 | Higuchi et al. |
| 2013/0102710 | A1 | 4/2013 | Noda et al. |
| 2013/0244010 | A1 | 9/2013 | Hasegawa et al. |

FOREIGN PATENT DOCUMENTS

| | | | |
|---|---|---|---|
| CN | 1331725 | | 1/2002 |
| CN | 1346379 | | 4/2002 |
| CN | 102959035 | | 3/2013 |
| CN | 103214681 | | 7/2013 |
| CN | 103214681 | A * | 7/2013 |
| CN | 103221440 | | 7/2013 |
| JP | 8-259744 | | 10/1996 |
| JP | 08259744 | A * | 10/1996 |
| JP | 2000-319426 | | 11/2000 |
| JP | 2004-169014 | | 6/2004 |
| JP | 2004169014 | A * | 6/2004 |
| JP | 2008-280421 | | 11/2008 |
| JP | 2010196047 | A * | 9/2010 |
| JP | 2013018922 | A * | 1/2013 |
| JP | 2015-96595 | | 5/2015 |
| JP | 2015-193806 | | 11/2015 |
| WO | 00/31181 | | 6/2000 |

OTHER PUBLICATIONS

Arranz et al. "Influence of isotacticity and molecular weight on the properties of metallocenic isotactic polypropylene," European Polymer Journal, vol. 43, pp. 2357-2370. (Year: 2007).*
Ariff et al. "Rheological Behaviour of Polypropylene Through Extrusion and Capillary Rheometry" Published by InTech, pp. 29-47 (2012). (Year: 2012).*
Ren et al., "Preparation of Polypropylene and Polyethylene Glycol Block Copolymers and Its Surface Modification of Polypropylene Films," Journal of Functional Polymers, Vo. 38, No. 4, pp. 386-402 (2015). (Year: 2015).*
Office Action issued Sep. 28, 2021 in corresponding Chinese Patent Application No. 201980009447.6, with English translation.
Ren Wei et al., "Preparation of Polypropylene and Polyethylene Glycol Block Copolymers and Its Surface Modification of Polypropylene Films", Journal of Functional Polymers, 2015, vol. 28, No. 4, pp. 386-402.
International Search Report issued Apr. 23, 2019 in International (PCT) Application No. PCT/JP2019/001852 with English-language translation.

(Continued)

*Primary Examiner* — Ha S Nguyen
(74) *Attorney, Agent, or Firm* — Wenderoth, Lind & Ponack, L.L.P.

(57) ABSTRACT

The present invention provides a resin modifier (Y) containing: a block polymer (X) that has a block of a hydrophobic polymer (a) and a block of a hydrophilic polymer (b) as constitutional units, the block polymer (X) having an orientation index (ω) obtained by the following formula of 1.5 to 15:

orientation index $(\omega)=(\beta)/(\alpha)$ wherein ($\alpha$) represents a weight ratio $[(\alpha_b)/(\alpha_a)]$ between the hydrophilic polymer (b) and the hydrophobic polymer (a) in the block polymer (X), and ($\beta$) represents a weight ratio $[(\beta_b)/(\beta_a)]$ between the hydrophilic polymer (b) and the hydrophobic polymer (a) determined by reflective infrared spectroscopy of the block polymer (X) heat-melted and pressed to a thickness of 500 μm.

11 Claims, No Drawings

(56) References Cited

OTHER PUBLICATIONS

Sangen et al., "Micro Phase-Separated Structure of Polyether-Polyester Block Copolymers and Wettabilities of the Polymer Surfaces", Kobunshi Ronbunshu, 1992, vol. 49, No. 5, pp. 459-466.
Translation of the Written Opinion of The International Searching Authority issued Apr. 23, 2019 in International (PCT) Application No. PCT/JP2019/001852.
Yamasaki et al., "Enrichment of the Component at the Film Surface for Polyether-Polyester Block Copolymer Which Incorporates the Poly (dimethyl siloxane) Unit", Kobunshi Ronbunshu, 1995, vol. 52, No. 8, pp. 465-471.
Yamasaki et al., "Effect of Crystallizability of Hard Segments in Polyether-Polyester Block Copolymers on the Segregation of a Soft Segment to Polymer Surface", Kobunshi Ronbunshu, 1993, vol. 50, No. 12, pp. 935-940.

\* cited by examiner

RESIN MODIFIER, RESIN COMPOSITION, MOLDING, AND MOLDED ARTICLE

TECHNICAL FIELD

The present invention relates to a resin modifier. Specifically, the present invention relates to a resin modifier that imparts excellent wettability and improved adhesion (coatability) to coating compositions, printing ink, and adhesives, to a thermoplastic resin without impairing the mechanical properties of the thermoplastic resin.

The wettability as used herein refers to compatibility with coating compositions, printing ink, and adhesives and is evaluated in terms of the wet tension described later.

BACKGROUND ART

Thermoplastic resins such as polyolefin resins are excellent in moldability, rigidity, heat resistance, chemical resistance, lightweight properties, and electrical insulation, and therefore are widely used in the form of moldings in various shapes including films, fibers, hollow fiber membranes.

On the other hand, thermoplastic resins do not have a polar group in the molecule to be what you call non-polar, highly inactive polymer materials. In particular, polyolefin resins are highly crystalline and have significantly low solubility in solvents. Therefore, thermoplastic resins have problems in adhesiveness or coatability. For example, since thermoplastic resins have poor wettability or adhesion to coating compositions, printing ink, and adhesives, they cannot be applied without surface treatment in the post processing.

Conventionally, the wettability or adhesion have been improved by performing a corona treatment or a plasma treatment on a surface of a molding of a thermoplastic resin such as a polyolefin resin (see Patent Literature 1) or adding a surfactant to a polyolefin resin composition and obtaining a molding from the composition (see Patent Literature 2).

CITATION LIST

Patent Literature

Patent Literature 1: JP 2000-319426 A
Patent Literature 2: JP 2004-169014 A

SUMMARY OF INVENTION

Technical Problem

However, in the method of performing a corona treatment or a plasma treatment on a molding surface, the number of processes increases and the wettability is unfortunately lowered with time after the treatment. In the method of adding a surfactant to a polyolefin resin composition and obtaining a molding from the composition, addition of a surfactant in an amount sufficient for fully exhibiting the modifying effect lowers the mechanical strength (tensile modulus of elasticity, impact resistance, and the like: The same shall apply hereafter) that a molding based on an original polyolefin resin is supposed to have. Also, the surfactant may bleed out from the molding to cause adhesion failures or uneven coating. These problems have been desired to be solved.

The present invention aims to provide a resin modifier that can impart excellent wettability and adhesion and persistence of these effects to a thermoplastic resin without impairing the mechanical strength.

Solution to Problem

The present inventors made intensive studies to solve the above problems to arrive at the present invention. The present invention relates to: a resin modifier (Y) containing a block polymer (X) that has a block of a hydrophobic polymer (a) and a block of a hydrophilic polymer (b) as constitutional units, the block polymer (X) having an orientation index ($\omega$) obtained by the following formula of 1.5 to 15; a resin composition (Z) containing the resin modifier (Y) and a thermoplastic resin (C); a molding produced by molding the resin composition (Z); and a molded article obtained by performing at least one treatment selected from the group consisting of coating, printing, and application of an adhesive on the molding.

Orientation index $(\omega) = (\beta)/(\alpha)$ wherein ($\alpha$) represents a weight ratio $[(\alpha_b)/(\alpha_a)]$ between the hydrophilic polymer (b) and the hydrophobic polymer (a) in the block polymer (X), and ($\beta$) represents a weight ratio $[(\beta_b)/(\beta_a)]$ between the hydrophilic polymer (b) and the hydrophobic polymer (a) determined by reflective infrared spectroscopy of the block polymer (X) heat-melted and pressed to a thickness of 500 μm.

Advantageous Effects of Invention

The resin modifier of the present invention, the resin composition of the present invention, the molding of the present invention, and the molded article of the present invention exert the following effects.

(1) The resin modifier of the present invention can impart modification properties, and excellent wettability and adhesion to coating compositions, printing ink, and adhesives (in particular, effect of improving coatability), to a thermoplastic resin without impairing the original mechanical strength (mechanical properties) of the thermoplastic resin, and allows persistence of these effects.

(2) The resin composition of the present invention is excellent in wettability and adhesion to coating compositions, printing ink, and adhesives (in particular, effect of improving coatability), and is also excellent in persistence of these effects.

(3) The molding of the present invention has excellent mechanical properties and excellent wettability, as well as favorable coatability and printability.

(4) The molded article of the present invention shows favorable adhesion to coating films or the like.

DESCRIPTION OF EMBODIMENTS

<Hydrophobic Polymer (a)>

Examples of the hydrophobic polymer (a) in the present invention include a polyolefin (a1) having a reactive group at each end, a polyolefin (a2) having a reactive group at one end, and a poly(meth)acrylate (a3) including alkyl (meth)acrylate comprising a C4-C32 alkyl group as a constituent monomer.

One type of the polymer (a) may be used alone or two or more thereof may be used in combination.

The reactive group refers to a carboxyl group, a carboxylic anhydride group, a hydroxyl group, an amino group, or an isocyanate group.

From the standpoint of modification properties, wettability modification, improvement of adhesion (improvement of coatability), and persistence of these effects of the molding described later, preferred among the hydrophobic polymers (a) are the polyolefin (a1) having a reactive group at each end and the polyolefin (a2) having a reactive group at one end.

The hydrophobic polymer refers to a polymer having a water absorption (24 hours) of less than 0.1% by weight. The water absorption (24 hours) can be measured by a known method. Specifically, the water absorption can be measured in conformity with the method of determining the water absorption according to JIS K7209 (2000).

<Polyolefin (a1) Having a Reactive Group at Each End>

Examples of the polyolefin (a1) include a polyolefin (a1-1) having a carboxyl group or a carboxylic anhydride group at each end of the polymer, a polyolefin (a1-2) having a hydroxyl group at each end of the polymer, a polyolefin (a1-3) having an amino group at each end of the polymer, and a polyolefin (a1-4) having an isocyanate group at each end of the polymer. Preferred among these is a polyolefin (a1-1) from the standpoint of ease of modification and heat resistance upon molding operation.

The end as used herein refers to a terminal portion where the repeated structure of the monomer unit constituting the polymer terminates. The "each end" refers to each end of the main chain of the polymer.

The polyolefin (a1) can be obtained by introducing a carboxyl group, a carboxylic anhydride group, a hydroxyl group, an amino group, or an isocyanate group to each end of a polyolefin (a1-0) containing a polyolefin in which each end is modifiable as a main component.

The "main component" means that the weight of the polyolefin in which each end is modifiable is 50% by weight or more in the weight of the whole polyolefin.

However, even in the case where the weight of the polyolefin in which each end is modifiable is less than 50% by weight in the weight of the whole polyolefin, if the total weight of the polyolefin in which each end is modifiable and a polyolefin in which one end is modifiable described later is 50% by weight or more in the weight of the whole polyolefin and the weight of the polyolefin in which each end is modifiable is greater than the weight of the polyolefin in which one end is modifiable, such a polyolefin is considered as the polyolefin (a1-0).

Examples of the polyolefin (a1-0) include a polyolefin obtainable by (co)polymerization of one type of a C2-C30 (preferably C2-C12, more preferably C2-C10) olefin or a mixture of two or more types thereof and containing 30 mol % or more of a propylene-derived constitutional unit, and a degraded polyolefin (one obtained by mechanically, thermally, or chemically degrading a high-molecular-weight polyolefin (preferably, having a number average molecular weight (hereafter, abbreviated as Mn) of 10,000 to 150,000)). Here, "(co)polymerization" means "polymerization or copolymerization".

Preferred among these is a degraded polyolefin, and more preferred is a thermally degraded polyolefin from the standpoint of ease of modification upon introduction of a carboxyl group, a carboxylic anhydride group, a hydroxyl group, an amino group, or an isocyanate group, and easy availability. Thermal degradation easily provides a low-molecular-weight polyolefin in which the number of terminal double bonds per molecule is one or two as described later, and the low-molecular-weight polyolefin is easily modifiable by introduction of a carboxyl group, a carboxylic anhydride group, a hydroxyl group, an amino group, or an isocyanate group.

The Mn of the polymer in the present invention can be measured by gel permeation chromatography (GPC) under the following conditions.

(Exemplary) device: "HLC-8120" product of Tosoh Corporation (Exemplary) column: "TSKgelGMHXL" (×2) product of Tosoh Corporation, "TSKgelMultiporeHXL-M" (×1) product of Tosoh Corporation Sample solution: 0.3% by weight o-dichlorobenzene solution Amount of solution added: 100 μl Flow rate: 1 ml/min.

Assay temperature: 135° C.

Detecting device: refractive index detector

Reference material: 12 items of standard polystyrene (TSKstandardPOLYSTYRENE) (molecular weight: 500, 1,050, 2,800, 5,970, 9,100, 18,100, 37,900, 96,400, 190,000, 355,000, 1,090,000, 2,890,000) products of Tosoh Corporation Examples of the thermally degraded polyolefin include one obtained by heating a high-molecular-weight polyolefin in an inert gas (one obtained by heating at 300° C. to 450° C. for 0.5 to 10 hours, for example, by the method described in JP H03-62804 A) and one obtained by thermal degradation by heating in the air.

Examples of the high-molecular-weight polyolefin used in the thermal degradation include one that is a (co)polymer (Mn of preferably 10,000 to 150,000, more preferably 15,000 to 70,000, melt flow rate (hereafter, abbreviated as MFR, unit: g/10 min) of preferably 0.5 to 150, more preferably 1 to 100) of one type of a C2-C30 (preferably C2-C12, more preferably C2-C10) olefin or a mixture of two or more types thereof and contains 30 mol % or more of a propylene-derived constitutional unit therein. Here, MFR refers to a numerical value representing the melt viscosity of the resin, and a larger MFR means a lower melt viscosity. The measurement of MFR is performed in conformity with the method specified in JIS K7210-1 (2014). In the case of polypropylene, for example, the measurement is performed under the conditions of 230° C. and a load of 2.16 kgf.

Examples of the C2-C30 olefin include a C2-C30 α-olefin and a C4-C30 diene.

Examples of the C2-C30 α-olefin include ethylene, propylene, 1-butene, 4-methyl-1-pentene, 1-pentene, 1-octene, 1-decene, 1-dodecene, 1-icosene, and 1-tetracosene.

Examples of the C4-C30 diene include butadiene, isoprene, cyclopentadiene, and 1,11-dodecadiene.

From the standpoint of molecular weight control, preferred among the C2-C30 olefins are a C2-C12 α-olefin, butadiene, isoprene, and mixtures of these, more preferred are a C2-C10 α-olefin, butadiene, and mixtures of these, and particularly preferred are ethylene and propylene that are C2-C3 α-olefins and mixtures of these.

The polyolefin (a1-0) has a Mn of preferably 800 to 20,000, more preferably 1,000 to 10,000, particularly preferably 1,200 to 6,000 from the standpoint of wettability modification, improvement of adhesion (improvement of coatability), and persistence of these effects of the molding described later.

The average number of terminal double bonds per molecule of the polyolefin (a1-0) is preferably 1.1 to 2.5, more preferably 1.3 to 2.2, particularly preferably 1.5 to 2.0 from the standpoint of wettability modification, improvement of adhesion (improvement of coatability), and persistence of these effects of the molding described later and also from the standpoint of ease of structure control and thermoplasticity of a block polymer (X) described later.

A method of obtaining a low-molecular-weight polyolefin by thermal degradation easily provides a polyolefin (a1-0) having an average number of terminal double bonds per molecule of 1.1 to 2.5 with a Mn within a range of 800 to 20,000.

<Polyolefin (a2) Having a Reactive Group at One End>

Examples of the polyolefin (a2) include a polyolefin (a2-1) having a carboxyl group or a carboxylic anhydride group at one end of the polymer, a polyolefin (a2-2) having a hydroxyl group at one end of the polymer, a polyolefin (a2-3) having an amino group at one end of the polymer, a polyolefin (a2-4) having an isocyanate group at one end of the polymer, and a polyolefin (a2-5) having both a carboxyl group and a hydroxyl group at one end of the polymer.

Preferred among these is the polyolefin (a2-1) from the standpoint of ease of modification and heat resistance upon molding operation.

Here, one end means either one end in the main chain of the polymer.

The polyolefin (a2) can be obtained by introducing a carboxyl group, a carboxylic anhydride group, a hydroxyl group, an amino group, or an isocyanate group into a polyolefin (a2-0) containing a polyolefin in which one end is modifiable as a main component.

The "main component" means that the weight of the polyolefin in which one end is modifiable is 50% by weight or more in the weight of the whole polyolefin.

However, even in the case where the weight of the polyolefin in which one end is modifiable is less than 50% by weight in the weight of the whole polyolefin, if the total weight of the polyolefin in which one end is modifiable and the polyolefin in which each end is modifiable described above is 50% by weight or more in the weight of the whole polyolefin and the weight of the polyolefin in which one end is modifiable is greater than the weight of the polyolefin in which each end is modifiable, such a polyolefin is considered as the polyolefin (a2-0).

The polyolefin (a2-0) can be obtained in the same manner as in the case of the polyolefin (a1-0). The polyolefin (a2-0) has a Mn of preferably 800 to 20,000, more preferably 1,000 to 10,000, particularly preferably 1,200 to 6,000 from the standpoint of wettability modification, improvement of adhesion (improvement of coatability), and persistence of these effects of the molding described later.

The average number of terminal double bonds per molecule of the polyolefin (a2-0) is preferably 0.5 to 1.4, more preferably 0.6 to 1.3, particularly preferably 0.7 to 1.2, most preferably 0.8 to 1.1 from the standpoint of wettability modification, improvement of adhesion (improvement of coatability), and persistence of these effects of the molding, and ease of structure control and thermoplasticity of the block polymer (X) described later.

A method of obtaining a low-molecular-weight polyolefin by thermal degradation can easily provide a polyolefin (a2-0) having an average number of terminal double bonds per molecule of 0.5 to 1.4 with a Mn within a range of 800 to 20,000.

A low-molecular-weight polyolefin obtained by thermal degradation has the above average number of terminal double bonds and therefore is easily modified by introduction of a carboxyl group, a carboxylic anhydride group, a hydroxyl group, an amino group, or an isocyanate group.

The polyolefins (a1-0) and (a2-0) are commonly obtained as a mixture. The mixture may be used as it is or the polyolefin may be separated by purification to be used. From the standpoint of production cost or the like, the mixture is preferably used as it is.

Hereinbelow, a description is given on the polyolefins (a1-1) to (a1-4) having a carboxyl group, a carboxylic anhydride group, a hydroxyl group, an amino group, or an isocyanate group at each end of the polyolefin (a1-0). The polyolefins (a2-1) to (a2-4) having any of these groups at one end of the polyolefin (a2-0) can be obtained in the same manner as in the case of the polyolefins (a1-1) to (a1-4) by replacing the polyolefin (a1-0) with the polyolefin (a2-0).

Examples of the polyolefin (a1-1) include a polyolefin (a1-1-1) having a structure obtained by modifying the ends of the polyolefin (a1-0) with an α,β-unsaturated carboxylic acid (anhydride), a polyolefin (a1-1-2) having a structure obtained by secondarily modifying the polyolefin (a1-1-1) with a lactam or an aminocarboxylic acid, a polyolefin (a1-1-3) having a structure obtained by modifying the polyolefin (a1-0) by oxidation or hydroformylation, a polyolefin (a1-1-4) having a structure obtained by secondarily modifying the polyolefin (a1-1-3) with a lactam or an aminocarboxylic acid, and mixtures of two or more of these.

The "α,β-unsaturated carboxylic acid (anhydride)" refers to "an α,β-unsaturated carboxylic acid or its anhydride".

The polyolefin (a1-1-1) is obtainable by modifying the polyolefin (a1-0) with an α,β-unsaturated carboxylic acid (anhydride).

Examples of the α,β-unsaturated carboxylic acid (anhydride) used for the modification include a monocarboxylic acid, a dicarboxylic acid, and an anhydride of a mono- or dicarboxylic acid. Specific examples thereof include (meth)acrylic acid, maleic acid (anhydride), fumaric acid, itaconic acid (anhydride), and citraconic acid (anhydride).

From the standpoint of ease of modification, preferred among these are an anhydride of a mono- or dicarboxylic acid and a dicarboxylic acid, more preferred are maleic acid (anhydride) and fumaric acid, and particularly preferred is maleic acid (anhydride).

The "(meth)acrylic acid" refers to "acrylic acid or methacrylic acid".

The amount of the α,β-unsaturated carboxylic acid (anhydride) used for the modification is preferably 0.5 to 20% by weight, more preferably 1 to 15% by weight, particularly preferably 2 to 10% by weight based on the weight of the polyolefin (a1-0) from the standpoint of wettability modification and improvement of adhesion (improvement of coatability) of the molding, ease of structure control of the block polymer (X), and dispersibility of the block polymer (X) in a resin composition (Z) described later.

The modification by the α,β-unsaturated carboxylic acid (anhydride) can be performed, for example, by addition reaction (ene-reaction) of the α,β-unsaturated carboxylic acid (anhydride) to the terminal double bond of the polyolefin (a1-0) by a solution method or a melting method. The reaction temperature of this addition reaction is preferably 170° C. to 230° C.

The polyolefin (a1-1-2) can be obtained by secondarily modifying the polyolefin (a1-1-1) with a lactam or an aminocarboxylic acid.

Examples of the lactam used for the secondary modification include a C6-C12 (preferably C6-C8, more preferably C6) lactam. Specific examples thereof include caprolactam, enantholactam, laurolactam, and undecanolactam.

Examples of the aminocarboxylic acid include a C2-C12 (preferably C4-C12, more preferably C6-C12) aminocarboxylic acid. Specific examples thereof include an amino acid (e.g., glycine, alanine, valine, leucine, isoleucine, phenylalanine), ω-aminocaproic acid, ω-aminoenanthic acid, ω-aminocaprylic acid, ω-aminopelargonic acid, ω-aminocapric acid, 11-aminoundecanoic acid, and 12-aminododecanoic acid.

Preferred among these lactams and aminocarboxylic acids are caprolactam, laurolactam, glycine, leucine, w-aminocaprylic acid, 11-aminoundecanoic acid, and 12-aminododecanoic acid, more preferred are caprolactam, laurolactam, co-aminocaprylic acid, 11-aminoundecanoic acid, and 12-aminododecanoic acid, and particularly preferred are caprolactam and 12-aminododecanoic acid.

The amount of the lactam or the aminocarboxylic acid used for the secondary modification of the polyolefin (a1-1-1) is preferably 0.5 to 100% by weight, more preferably 1 to 50% by weight, particularly preferably 2 to 25% by weight based on the weight of the polyolefin (a1-1-1) from the standpoint of wettability modification and improvement of adhesion (improvement of coatability) of the molding, ease of structure control of the block polymer (X), and dispersibility of the block polymer (X) in the resin composition (Z) described later.

The polyolefin (a1-1-3) can be obtained by introducing a carboxyl group into the polyolefin (a1-0) through oxidization of the polyolefin (a1-0) with oxygen and/or ozone (oxidation method) or hydroformylation of the polyolefin (a1-0) (oxo method).

Introduction of a carboxyl group by an oxidation method can be carried out by a known method such as the method described in U.S. Pat. No. 3,692,877 B. Introduction of a carboxyl group by hydroformylation can be carried out by various methods including known methods such as the method described in Macromolecules, vol. 31, p. 5943.

The polyolefin (a1-1-4) can be obtained by secondarily modifying the polyolefin (a1-1-3) with a lactam or an aminocarboxylic acid.

Examples of the lactam and the aminocarboxylic acid used for the secondary modification of the polyolefin (a1-1-3) include those mentioned as the examples of the lactam and the aminocarboxylic acid used for the secondary modification of the polyolefin (a1-1-1). The preferred range and amount are also the same as those in the secondary modification of the polyolefin (a1-1-1).

The polyolefin (a1-1) has an acid value of preferably 4 to 100 mgKOH/g, more preferably 4 to 50 mgKOH/g, particularly preferably 5 to 30 mgKOH/g from the standpoint of reactivity with the hydrophilic polymer (b), ease of structure control and thermoplasticity of the block polymer (X).

The acid value in the present invention is determined by titration using a KOH/methanol solution containing phenolphthalein as an indicator. In the case where the acid group is a carboxylic anhydride group, the acid value is measured as the half-esterified acid value after half-esterification by methanol.

Examples of the polyolefin (a1-2) include polyolefins having a hydroxyl group obtainable by modifying the polyolefin (a1-1) with an amine having a hydroxyl group, and mixtures of two or more types of these.

Examples of the amine having a hydroxyl group usable for the modification include C2-C10 amines having a hydroxyl group. Specific examples thereof include 2-aminoethanol, 3-aminopropanol, 1-amino-2-propanol, 4-aminobutanol, 5-aminopentanol, 6-aminohexanol, and 3-aminomethyl-3,5,5-trimethyl cyclohexanol.

Preferred among these are C2-C6 amines having a hydroxyl group (e.g., 2-aminoethanol, 3-aminopropanol, 4-aminobutanol, 5-aminopentanol, 6-aminohexanol), more preferred are 2-aminoethanol and 4-aminobutanol, and particularly preferred is 2-aminoethanol from the standpoint of ease of modification.

The amount of the amine having a hydroxyl group used for the modification is preferably 0.5 to 20% by weight, more preferably 1 to 15% by weight, particularly preferably 2 to 10% by weight based on the amount of the polyolefin (a1-1) from the standpoint of wettability modification and improvement of adhesion (improvement of coatability) of the molding, ease of structure control of the block polymer (X), and the dispersibility of the block polymer (X) in the resin composition (Z) described later.

The polyolefin (a1-2) has a hydroxyl value of preferably 4 to 100 mgKOH/g, more preferably 4 to 50 mgKOH/g, particularly preferably 5 to 30 mgKOH/g from the standpoint of reactivity with the hydrophilic polymer (b) and ease of structure control and themoplasticity of the block polymer (X).

Examples of the polyolefin (a1-3) include polyolefins having an amino group obtainable by modifying the polyolefin (a1-1) with a diamine, and mixtures of two or more types of these.

Examples of the diamine include C2-C12 diamines. Specific examples thereof include ethylenediamine, hexamethylenediamine, heptamethylenediamine, octamethylenediamine, and decamethylenediamine.

Preferred among these are C2-C8 diamines (e.g., ethylenediamine, hexamethylenediamine, heptamethylenediamine, octamethylenediamine), more preferred are ethylenediamine and hexamethylenediamine, and particularly preferred is ethylenediamine from the standpoint of ease of modification.

The amount of the diamine used for the modification of the polyolefin (a1-1) is preferably 0.5 to 20% by weight, more preferably 1 to 15% by weight, particularly preferably 2 to 10% by weight based on the weight of the polyolefin (a1-1) from the standpoint of wettability modification and improvement of adhesion (improvement of coatability) of the molding, ease of structure control of the block polymer (X), and the dispersibility of the block polymer (X) in the resin composition (Z) described later. The modification of the polyolefin (a1-1) with diamine is preferably carried out by a method in which a diamine is used in an amount of preferably 0.5 to 1,000% by weight, more preferably 1 to 500% by weight, particularly preferably 2 to 300% by weight based on the weight of the polyolefin (a1-1) from the standpoint of preventing the crosslinking reaction between polymer molecules, followed by removal of an unreacted diamine under reduced pressure at 120° C. to 230° C.

The amine value of the polyolefin (a1-3) is preferably 4 to 100 mgKOH/g, more preferably 4 to 50 mgKOH/g, particularly preferably 5 to 30 mgKOH/g from the standpoint of the reactivity with the hydrophilic polymer (b) and ease of structure control and thermoplasticity of the block polymer (X).

Examples of the polyolefin (a1-4) include polyolefins having an isocyanate group obtainable by modifying the polyolefin (a1-2) with a poly-(2 to 3, or greater) isocyanate, and mixtures of two or more types of these.

Examples of the polyisocyanate include aromatic polyisocyanates having a carbon number (The carbon atom in the isocyanate group is excluded: The same shall apply hereafter) of 6 to 20, aliphatic polyisocyanates having a carbon number of 2 to 18, alicyclic polyisocyanates having a carbon number of 4 to 15, aromatic aliphatic polyisocianates having a carbon number of 8 to 15, modified products of these polyisocyanates, and mixtures of two or more types of these.

Examples of the aromatic polyisocyanates include 1,3- or 1,4-phenylene diisocyanate, 2,4- or 2,6-tolylene diisocyanate (TDI), crude TDI, 2,4'- or 4,4'-diphenylmethane diisocyanate (MDI), 4,4'-diisocyanatobiphenyl, 3,3'-dimethyl-4,4'-diisocyanatebiphenyl, 3,3'-dimethyl-4,4'-diisocyanate diphenylmethane, and 1,5-naphthylene diisocyanate.

Examples of the aliphatic polyisocyanates include ethylene diisocyanate, tetramethylene diisocyanate, hexamethylene diisocyanate (HDI), dodecamethylene diisocyanate, 2,2,4-trimethyl hexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanate hexanoate.

Examples of the alicyclic polyisocyanates include isophorone diisocyanate (IPDI), dicyclohexylmethane-4,4'-diisocyanate (hydrogenated MDI), cyclohexylene diisocyanate, methyl cyclohexylene diisocyanate (hydrogenated TDI), bis(2-isocyanatoethyl)-4-cyclohexene-1,2-dicarboxylate, and 2,5- or 2,6-norbornane diisocyanate.

Examples of the aromatic aliphatic polyisocyanates include m- or p-xylylene diisocyanate (XDI) and $\alpha,\alpha,\alpha',\alpha'$-tetramethylxylylene diisocyanate (TMXDI).

Examples of the modified products of the polyisocyanates include urethane-modified products, urea-modified products, carbodiimide-modified products, and uretdione-modified products.

Among the polyisocyanates, preferred are TDI, MDI, and HDI, and more preferred is HDI.

The reaction between the polyisocyanate and the polyolefin (a1-2) can be carried out in the same manner as in common urethanization.

The equivalent ratio (NCO:OH) between the isocyanate group of the polyisocyanate and the hydroxyl group of the polyolefin (a1-2) is preferably 1.8:1 to 3:1, more preferably 2:1.

For promotion of the urethanization, a catalyst commonly used for urethanization may be used, if needed. Examples of the catalyst include metal catalysts (tin catalysts (e.g., dibutyltindilaurate, stannous octanoate), lead catalysts (e.g., 2-ethyl lead hexanoate, lead octenate), other metal catalysts (e.g., metal naphthenates (e.g., cobalt naphthenate), phenylmercury propionate)); amine catalysts (e.g., triethylenediamine, diazabicycloalkenes (e.g., 1,8-diazabicyclo[5,4,0] undecene-7), dialkyl aminoalkyl amines (e.g., dimethyl aminoethylamine, dimethyl aminooctylamine), carbonates or organic acid (e.g., formic acid) salts of heterocyclic aminoalkyl amines (e.g., 2-(1-aziridinyl)ethylamine, 4-(1-piperidinyl)-2-hexylamine), N-methyl or ethyl morpholine, triethylamine, diethyl- or dimethyl ethanolamine); and combinations of two or more types of these.

The amount of the catalyst used is preferably 3% by weight or less, more preferably 0.001 to 2% by weight based on the total weight of the polyisocyanate and the polyolefin (a1-2).

Examples of the polyolefin (a2-5) include a polyolefin (a2-5-1) having a structure obtained by first modifying one end of the polyolefin (a2-0) with an $\alpha,\beta$-unsaturated carboxylic acid anhydride and secondarily modifying the foregoing polyolefin with a diol amine.

Examples of the diol amine include diethanolamine.

The polyolefins (a1) and (a2) each have a Mn of preferably 1,000 to 25,000, more preferably 1,500 to 12,000, particularly preferably 2,000 to 7,000 from the standpoint of the dispersibility of the block polymer (X), the mechanical properties of the molding, and the wettability modification effect, improvement of adhesion (improvement of coatability), and persistence of these effects.

The polyolefins (a1) and (a2) each have a propylene-derived constitutional unit in an amount of 30 to 100 mol %, preferably 35 to 100 mol %, more preferably 50 to 100 mol %, particularly preferably 80 to 100 mol %, most preferably 96 to 100 mol % from the standpoint of the mechanical properties of the resin composition (Z) (especially in the case of using a polypropylene resin), and the wettability modification effect, improvement of adhesion (improvement of coatability), and persistence of these effects.

The use of the polyolefins (a1-0) and (a2-0) each having a propylene-derived constitutional unit in an amount of 30 to 100 mol % provides the polyolefins (a1) and (a2) each having a predetermined propylene content.

In the polyolefins (a1) and (a2), the isotacticity of the propylene part is preferably 90% to 100% from the standpoint of the dispersibility of the block polymer (X), the mechanical properties of the molding, and the wettability modification effect, improvement of adhesion (improvement of coatability), and persistence of these effects.

The isotacticity in the present invention can be calculated using $^{13}$C-NMR (nuclear magnetic resonance spectroscopy). It is commonly known that a side-chain methyl group is influenced by the configurations (meso or racemo) including methyl groups on both adjacent sides (triad), including methyl groups on both adjacent sides of the triad (pentad), and including methyl groups on both adjacent sides of the pentad (heptad), and peaks are observed in different chemical shifts. The tacticity evaluation is commonly performed for the pentad. The isotacticity in the present invention can be calculated based on the evaluation of the pentad.

Specifically, the isotacticity can be calculated by the following formula wherein (H) is each pentad peak obtained in the chemical shift range of 19.0 to 20.0 ppm and (Ha) is a carbon peak (peak observed at 21.8 ppm) derived from methyl groups in the isotactic propylene in which the pentad consists only of the meso structures among the carbon peaks derived from side-chain methyl groups in the propylene obtained by $^{13}$C-NMR.

$$\text{Isotacticity (\%)} = [(H_a)/\Sigma(H)] \times 100 \quad (1)$$

In the formula, $H_a$ represents the peak height of the isotactic (the pentad consists of the meso structures only) signal and H represents each peak height of the pentad.

<Poly(Meth)Acrylate (a3) Including Alkyl (Meth)Acrylate Comprising a C4-C32 Alkyl Group as a Constituent Monomer>

A poly(meth)acrylate (a3) is a poly(meth)acrylate including an alkyl (meth)acrylate comprising a C4-C32 alkyl group as a constituent monomer.

Examples of the alkyl group of the alkyl (meth)acrylate comprising a C4-C32 alkyl group as a constituent monomer include n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-octadecyl, n-nonadecyl, n-eicosyl, n-heneicosyl, n-docosyl, n-tricosyl, n-tetracosyl, n-pentacosyl, n-hexacosyl, n-heptacosyl, n-octacosyl, n-nonacosyl, n-triacontyl, n-hentriacontyl, and n-dotriacontyl groups.

Among the poly(meth)acrylates (a3), preferred are alkyl (meth)acrylates having a C12-C32 linear or branched alkyl group, more preferred are alkyl (meth)acrylates having a C16-C32 linear or branched alkyl group, particularly preferred are alkyl (meth)acrylates having a C20-C32 branched alkyl group from the standpoint of the wettability modification, improvement of adhesion (improvement of coatability), and persistence of these effects of the molding described later.

The poly(meth)acrylate (a3) has a Mn of preferably 800 to 20,000, more preferably 1,000 to 10,000, particularly preferably 1,200 to 6,000, from the standpoint of the wettability modification and improvement of adhesion (improvement of coatability) of the molding described later and the persistence of these effects.

In introduction of a reactive functional group to an end of the poly(meth)acrylate, a hydroxyl group or an epoxy group can be introduced as a reactive functional group by a known method such as living radical polymerization.

<Hydrophilic Polymer (b)>

Examples of the hydrophilic polymer (b) in the present invention include a polyether (b1), a polyether-containing hydrophilic polymer (b2), a cationic polymer (b3), an anionic polymer (b4), polyglycerol (b5), and polyvinyl alcohol (b6). Each of the hydrophilic polymers (b) may be used alone or in combination of two or more thereof.

Among the hydrophilic polymers (b), preferred are the polyether (b1), the polyether-containing hydrophilic polymer (b2), the cationic polymer (b3), and the anionic polymer (b4), more preferred are the polyether (b1) and the polyether-containing hydrophilic polymer (b2), and the particularly preferred is the polyether (b1) from the standpoint of the modification properties, wettability modification, improvement of adhesion (improvement of coatability), and persistence of these effects of the molding described later.

The hydrophilic polymer refers to a polymer having a water absorption (24 hours) of 0.1% by weight or more.

The hydrophilic polymer (b) has a Mn of preferably 500 to 10,000, more preferably 1,000 to 6,000, particularly preferably 2,000 to 4,000 from the standpoint of the wettability modification and improvement of adhesion (improvement of coatability) of the molding described later and the reactivity with the hydrophobic polymer (a).

<Polyether (b1)>

The polyether (b1) used is preferably a polyether monool (b1-1), a polyether monoamine (b1-2), or a modified product (b1-3) of either one of these from the standpoint of the structure control of the block polymer (X).

Examples of the polyether monool (b1-1) include a polyether monool represented by the formula (1).

[Chem. 1]

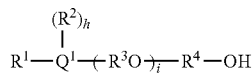

(1)

In the formula (1), $R^1$ and $R^2$ are each independently a C1-C12 hydrocarbon group; $Q^1$ is an oxygen atom or a nitrogen atom; h is 0 when $Q^1$ is an oxygen atom and h is 1 when $Q^1$ is a nitrogen atom; $R^3$ and $R^4$ are each independently a C1-C4 alkylene group; $(R^3O)$s may be the same as or different from each other and the bonding form thereof may be a block form or a random form; and i is an integer of 10 to 250.

Preferred as $R^1$ and $R^2$ in the formula (1) are a C1-C12 aliphatic hydrocarbon group and a C6-C12 aromatic hydrocarbon group, more preferred are a C1-C6 aliphatic hydrocarbon group and a phenyl group, particularly preferred are a methyl group and a hexyl group, and most preferred is a methyl group from the standpoint of the wettability modification effect, the improvement of adhesion (improvement of coatability), and the persistence of these effects.

Preferred as $(R^3O)$s in the formula (1) are oxyethylene groups alone and a combination of oxyethylene groups and other oxyalkylene groups, and more preferred are oxyethylene groups alone from the standpoint of the wettability modification effect, the improvement of adhesion (improvement of coatability), and the persistence of these effects.

Preferred as $R^4$ in the formula (1) is an ethylene group from the standpoint of the wettability modification effect, the improvement of adhesion (improvement of coatability), and the persistence of these effects.

The polyether monool represented by the formula (1) wherein $R^3$ is a methylene group can be obtained by a method involving polymerization or ring-opening polymerization of formaldehyde or a cyclic compound (e.g., 1,3,5-trioxane, 1,3,5,7-tetraoxane (tetramer), 1,3,5,7,9-pentaoxane (pentamer)) having an oxymethylene structure as a repeating unit with a cationic polymerization initiator such as boron trifluoride in the presence of a C1-C12 monool, or by a method involving copolymerization of a cyclic compound having an oxymethylene structure as a repeating unit with ethylene oxide or 1,3-dioxolan using methylal $(CH_3OCH_2OCH_3)$ as a chain transfer agent to cause a chain-transfer reaction for end-capping of a polymer end with a methoxy group.

The polyether monool represented by the formula (1) wherein $R^3$ is a C2-C4 alkylene group can be obtained by an addition reaction of a C2-C4 alkylene oxide (hereafter, abbreviated as AO) to a C1-C12 monool or a C2-C24 secondary amine.

Examples of the C1-C12 monool include C1-C12 aliphatic monohydric alcohols (e.g., methanol, ethanol, propanol, butanol, hexanol, neopentyl alcohol, dodecane monool), C5-C12 alicyclic monohydric alcohols (e.g., mono(hydroxymethyl)cyclohexane, mono(hydroxymethyl)cycloheptane), and C6-C12 monohydric phenol compounds (e.g., phenol, phenol having a C1-C6 alkyl group, naphthol).

Among these, preferred are C1-C12 aliphatic monohydric alcohols and C6-C12 monohydric phenol compounds, more preferred are C1-C6 aliphatic monohydric alcohols and phenol, particularly preferred are methanol and hexanol, and most preferred is methanol from the standpoint of the wettability modification effect, the improvement of adhesion (improvement of coatability), and the persistence of these effects.

Examples of the C2-C24 secondary amine include dimethylamine, diethylamine, ethylmethylamine, di-n-propylamine, diisopropylamine, isopropyl ethylamine, di-sec-butylamine, di-t-butylamine, dicyclohexylamine, isopropylcyclohexylamine, diphenylamine, and carbazole.

The AO added to the C1-C12 monool or the C2-C24 secondary amine may be a C2-C4 AO (ethylene oxide (hereafter, abbreviated as EO), 1,2- or 1,3-propylene oxide (hereafter, abbreviated as PO), 1,2-, 1,3-, 1,4-, or 2,3-butylene oxide (hereafter, abbreviated as BO)), and a combination of two or more of these. If needed, another AO (e.g., C5-C12 α-olefin oxide, styrene oxide, epihalohydrin (e.g., epichlorohydrin)) may be used together at a small rate (30% by weight or less based on the total weight of AOs).

The bonding form when two or more AOs are used in combination may be either a random form or a block form. The AO is preferably an EO alone or a combination of an EO and another AO, particularly preferably an EO alone from the standpoint of the wettability modification, improvement of adhesion (improvement of coatability), and persistence of these effects of the molding described later.

The addition reaction of an AO can be carried out by a known method, for example, at a temperature of 100° C. to 200° C. in the presence of an alkaline catalyst.

The (R³O) content based on the weight of the polyether monool represented by the formula (1) is preferably 5 to 99.8% by weight, more preferably 8 to 99.6% by weight, particularly preferably 10 to 98% by weight from the standpoint of the wettability modification, improvement of adhesion (improvement of coatability), and the persistence of these effects of the molding described later.

The preferable range of i in the formula (1) is therefore a range that makes the (R³O) content fall within the above preferable range.

The oxyethylene group content based on the weight of (R³O) in the formula (1) is preferably 70 to 100% by weight, more preferably 85 to 100% by weight, particularly preferably 95 to 100% by weight, most preferably 100% by weight from the standpoint of the wettability modification, improvement of adhesion (improvement of coatability), and the persistence of these effects of the molding described later.

Examples of the polyether monoamine (b1-2) include a polyether monoamine represented by the formula (2).

[Chem. 2]

(2)

In the formula (2), $R^5$ and $R^6$ are each independently a C1-C12 hydrocarbon group; $Q^2$ is an oxygen atom or a nitrogen atom; j is 0 when $Q^2$ is an oxygen atom and j is 1 when $Q^2$ is a nitrogen atom; $R^7$ is a C1-C4 alkylene group; $R^8$ is a C2-C4 alkylene group; ($R^7O$)s may be the same as or different from each other and the bonding form thereof may be a block form or a random form; and k is an integer of 10 to 250.

The polyether monoamine represented by the formula (2) can be obtained by converting the hydroxyl group of the polyether monool represented by the formula (1) to an alkyl amino group. For example, the polyether monoamine represented by the formula (2) can be produced by reacting the polyether monool represented by the formula (1) with acrylonitrile, followed by hydrogenation of the obtained cyanoethylated product.

Examples of $R^5$, $R^6$, and $R^7$ in the formula (2) include those mentioned as the examples of $R^1$, $R^2$, and $R^3$ in the formula (1). The same shall apply to the preferred examples.

The preferable ranges of ($R^7O$), k, the ($R^7O$) content, and the oxyethylene group content in ($R^7O$) in the formula (2) are the same as those of ($R^3O$), i, the ($R^3O$) content, and the oxyethylene group content in ($R^3O$) in the formula (1).

Examples of the modified product (b1-3) include a carboxylic acid-modified product (terminal carboxyl group), an isocyanate-modified product (terminal isocyanate group), an aminocarboxylic acid-modified product (terminal amino group), and an epoxy-modified product (terminal epoxy group) of the polyether monool (b1-1) or the polyether monoamine (b1-2). The isocyanate-modified product can be obtained by reacting the polyether monool (b1-1) or the polyether monoamine (b1-2) with a polyisocyanate or reacting the polyether monoamine (b1-2) with phosgene.

The aminocarboxylic acid-modified product can be obtained by reacting the polyether monool (b1-1) or the polyether monoamine (b1-2) with an aminocarboxylic acid or a lactam.

The epoxy-modified product can be obtained by reacting the polyether monool (b1-1) or the polyether monoamine (b1-2) with a diepoxide (an epoxy resin such as diglycidyl ether, diglycidyl ester, or alicyclic diepoxide: epoxy equivalent of 85 to 600) or reacting the polyether monool (b1-1) with an epihalohydrin (e.g., epichlorohydrin).

<Polyether-Containing Hydrophilic Polymer (b2)>

Examples of the polyether-containing hydrophilic polymer (b2) include a polyether ester amide (b2-1) having a segment of the polyether monool (b1-1), a polyether amideimide (b2-2) having a segment of the polyether monool (b1-1), a polyether ester (b2-3) having a segment of the polyether monool (b1-1), a polyether amide (b2-4) having a segment of the polyether monoamine (b1-2), and a polyether urethane (b2-5) having a segment of the polyether monool (b1-1) or the polyether monoamine (b1-2).

The polyether ester amide (b2-1) is configured by a polyamide having a carboxyl group at each end among polyamides (e.g., nylon 12, nylon 6) and the polyether monool (b1-1).

Examples of the polyamide having a carboxyl group at each end include a ring-opening polymerization product of a lactam, a polycondensation product of an aminocarboxylic acid, and a polyamide obtained from a diamine and a dicarboxylic acid having a C2-C12 linear hydrocarbon group.

Preferred among the polyamides having a carboxyl group at each end are a ring-opening polymerization product of caprolactam, a polycondensation product of 12-aminododecanoic acid, and a polyamide obtained from adipic acid and hexamethylenediamine, and more preferred are a ring-opening polymerization product of caprolactam from the standpoint of the dispersibility of the block polymer (X) in the resin composition (Z) described later.

The polyether amideimide (b2-2) is configured from a polyamideimide having at least one imide ring and the polether monool (b1-1).

Examples of the polyamideimide include a polymer composed of a lactam and a trivalent or tetravalent aromatic polycarboxylic acid capable of forming the at least one imide ring, a polymer composed of an aminocarboxylic acid and a trivalent or tetravalent aromatic polycarboxylic acid, and a polymer composed of a polyamide and a trivalent or tetravalent aromatic polycarboxylic acid, and mixtures of these.

Examples of the polyether ester (b2-3) include those composed of a polyester and the polyether monool (b1-1).

Examples of the polyester include a polyester prepared from a dicarboxylic acid and a diol.

Examples of the polyether amide (b2-4) include those composed of a polyamide and the polyether monoamine (b1-2).

The polyether urethane (b2-5) is composed of a diisocyanate among polyisocyanates, the polyether monool (b1-1) or the polyether monoamine (b1-2), and, if needed, a chain extender (e.g., a C2-C12 linear or branched aliphatic diol (e.g., ethylene glycol, 1,3-propylene glycol, 1,4-butanediol, 1,5-pentanediol, and 1,6-hexanediol), the above diamines).

The polyether segment content in the polyether-containing hydrophilic polymer (b2) based on the weight of the polyether hydrophilic polymer (b2) is preferably 70 to 99% by weight, more preferably 90 to 99% by weight from the standpoint of the wettability modification and improvement of adhesion (improvement of coatability) of the molding.

From the standpoint of structure control of the block polymer (X), a polyether diol represented by the formula (1) wherein $Q^1$ is an oxygen atom and $R^1$ is a hydrogen atom cannot be used. However, reaction of the polyolefin (a1-2) or (a2-2) with the C2-C4 AO, formaldehyde, or the cyclic compound having an oxymethylene structure as a repeating unit can produce a block polymer which is prepared from the polyether monool represented by the formula (1) and wherein $Q^1$ is an oxygen atom and $R^1$ is a hydrogen atom, that is, a block polymer having a hydroxyl group at a molecular.

A block represented by the formula (3) that is a block of the hydrophilic polymer (b) can be introduced into the block polymer (X) by a reaction of the polyether monool represented by the formula (1) or the polyether monoamine represented by the formula (2) with the polyolefin (a1) by a method described later, an addition reaction of the C2-C4 AO to the polyolefin (a1-2) or (a2-2), or (ring opening) polymerization of formaldehyde or the cyclic compound having an oxymethylene structure as a repeating unit.

[Chem. 3]

(3)

In the formula (3), $Q^3$ is an oxygen atom or a nitrogen atom; m is 0 and $R^9$ is a C1-C12 hydrocarbon group or a hydrogen atom when $Q^3$ is an oxygen atom and m is 1 and $R^9$ and $R^{10}$ are each independently a C1-C12 hydrocarbon group when $Q^3$ is a nitrogen atom; $R^{11}$ and $R^{12}$ are each independently a C1-C4 alkylene group; ($R^{11}$O)s may be the same as or different from each other and the bonding form thereof may be a block form or a random form; and n is an integer of 10 to 250.

Preferred as $R^9$ and $R^{10}$ in the formula (3) are C1-C12 aliphatic hydrocarbon groups and C6-C12 aromatic hydrocarbon groups, more preferred are C1-C6 aliphatic hydrocarbon groups and a phenyl group, particularly preferred are a methyl group and a hexyl group, and most preferred is a methyl group from the standpoint of the wettability modification effect, the improvement of adhesion (improvement of coatability), and the persistence of these effects.

Preferred as ($R^{11}$O)s in the formula (3) are oxyethylene groups alone and a combination of oxyethylene groups and other oxyalkylene groups and more preferred are oxyethylene groups alone from the standpoint of the wettability modification effect, the improvement of adhesion (improvement of coatability), and the persistence of these effects.

Preferred as $R^{12}$ in the formula (3) is an ethylene group from the standpoint of the wettability modification effect, the improvement of adhesion (improvement of coatability), and the persistence of these effects.

The ($R^{11}$O) content based on the weight of the polyether monool represented by the formula (3) is preferably 5 to 99.8% by weight, more preferably 8 to 99.6% by weight, particularly preferably 10 to 98% by weight from the standpoint of the wettability modification, improvement of adhesion (improvement of coatability), and persistence of these effects of the molding described later.

The preferable range of n in the formula (3) is therefore a range that makes the ($R^{11}$O) content fall within the above preferable range.

The oxyethylene group content based on the weight of ($R^{11}$O) in the formula (3) is preferably 70 to 100% by weight, more preferably 85 to 100% by weight, particularly preferably 95 to 100% by weight, most preferably 100% by weight from the standpoint of the wettability modification, improvement of adhesion (improvement of coatability), and persistence of these effects of the molding described later.

<Cationic Polymer (b3)>

Examples of the cationic polymer (b3) include those mentioned in JP 3488163 B and polymers having a cationic group separated by a non-ionic molecular chain in the molecule.

Examples of the non-ionic molecular chain include a divalent hydrocarbon group having one or more groups selected from the group consisting of a divalent hydrocarbon group, an ether bond, a thioether bond, a carbonyl bond, an ester bond, an imino bond, an amide bond, an imide bond, a urethane bond, a urea bond, a carbonate bond, and a siloxy bond, and a hydrocarbon group having a heterocyclic structure including a nitrogen atom or an oxygen atom.

<Anionic Polymer (b4)>

Examples of the anionic polymer (b4) include those mentioned in JP 3488163 B, polymers having a dicarboxylic acid (y') (e.g., 5-sulfoisophthalic acid) having a sulfonyl group and a diol (b0) or a polyether (b1) as essential constituent units and also having 2 to 80, preferably 3 to 60 sulfonyl groups in the molecule.

<Polyglycerol (b5), Polyvinyl Alcohol (b6)>

The polyglycerol (b5) and the polyvinyl alcohol (b6) each may be a known one.

<Block Polymer (X)>

The block polymer (X) in the present invention has a block of a hydrophobic polymer (a) and a block of a hydrophilic polymer (b) as constitutional units. The block polymer (X) has an orientation index (ω) below of 1.5 to 15, preferably 1.6 to 10, more preferably 1.8 to 5.0, particularly preferably 2.0 to 3.0.

Orientation index (ω)=(β)/(α)

(α): Weight ratio [($α_b$)/($α_a$)] between the hydrophilic polymer (b) and the hydrophobic polymer (a) in the block polymer (X)

(β): Weight ratio [($β_b$)/($β_a$)] between the hydrophilic polymer (b) and the hydrophobic polymer (a) determined by reflective infrared spectroscopy of the block polymer (X) heat-melted and pressed to a thickness of 500 μm The block of a hydrophobic polymer (a) as used herein refers to a structural unit of a polymer constituted by a single hydrophobic polymer (a) and the block of a hydrophilic polymer (b) refers to a structural unit of a polymer constituted by a single hydrophilic polymer (b).

When the orientation index (ω) is less than 1.5, the modification properties tend to be insufficient. When the orientation index (ω) is more than 15, the mechanical strength tends to be insufficient.

The orientation index (ω) can be adjusted by adjusting the molecular structure, molecular weight, and composition of the block polymer.

The orientation index (ω) can be calculated by the following procedure.

The ($\alpha$) is obtained by performing nuclear magnetic resonance spectroscopy (NMR) and transmission infrared spectroscopy on the block polymer (X) and calculating the weight ratio [($\alpha_b$)/($\alpha_a$)].

The ($\beta$) is obtained by performing: (1) heat-melting press molding of the block polymer (X); and (2) reflective infrared spectroscopy on the molded block polymer (X), followed by calculation of the weight ratio [($\beta_b$)/($\beta_a$)].

(1) Heat-Melting Press Molding
- (Exemplary) device: Manual hydraulic heat press (product of Imoto Machinery Co., Ltd.
- Sample amount: 5 g
- Holding substrate: Release paper (silicone type)
- Heat press conditions
  - Temperature: 170±10° C., pressure: 2 MPa, Duration: two minutes, Thickness: 500 μm
- Cooling: Sample interposed between release paper is allowed to stand still to be slowly cooled at room temperature (25±10° C.)

(2) Reflective Infrared Spectroscopy
- (Exemplary) device: Fourier transform infrared spectrophotometer (IR) "IR Affinity-1" (product of Shimadzu Corporation)
- Prism: Ge prism
- Measurement site: A range within ±3 cm from the center of the upper surface of heat-pressed sample is measured.

From the standpoint of the modification properties and the mechanical properties, the molecular structure of the block polymer (X) is preferably any of the following (1) to (3) structures:

(1) a linear (a)-(b) diblock structure;
(2) a linear (b)-(a)-(b) triblock structure; and
(3) a branched structure in which two or three blocks of the hydrophilic polymer (b) are bonded to one end of the block of the hydrophobic polymer (a).

The structure of the block polymer (X) is preferably the (a)-(b) diblock structure or the (b)-(a)-(b) triblock structure, particularly preferably the (a)-(b) diblock structure from the standpoint of the wettability modification and improvement of adhesion (improvement of coatability) of the molding and the dispersibility of the block polymer (X) in the resin composition (Z) described later.

The block polymer having a molecular structure selected from the structures (1) to (3) can be obtained by the following method.

The block polymer having a linear (a)-(b) diblock structure can be obtained by reacting the polyolefin (a2-1) with the polyether monool (b1-1) or the polyether monoamine (b1-2) at a molar ratio of 1:1 or reacting the polyolefin (a1-1) with the polyether monool (b1-1) or the polyether monoamine (b1-2) at a molar ratio of 1:1.

Alternatively, the block polymer having a linear (a)-(b) diblock structure in which a hydroxyl group is present at an end of the block of the polyether (b1) can be obtained by an addition reaction of an AO to the polyolefin (a2-2).

The block polymer having a linear (b)-(a)-(b) triblock structure can be obtained by reacting the polyolefin (a1-1) with the polyether monool (b1-1) or the polyether monoamine (b1-2) at a molar ratio of 1:2.

Alternatively, the block polymer having a linear (b)-(a)-(b) triblock structure in which a hydroxyl group is present at an end of the block of the polyether (b1) can be obtained by an addition reaction of an AO to the polyolefin (a2-1).

The block polymer having a branched structure in which two or three blocks of the hydrophilic polymer (b) are bonded to one end of the block of the hydrophobic polymer (a) can be obtained by reacting a polyolefin having a carboxylic anhydride group at one end of the polymer, among the polyolefins (a2-1), with the polyether monool (b1-1) at a molar ratio of 1:2.

The carboxylic anhydride group present at one end of the polymer can be regarded as a dicarboxylic acid dehydration-condensed in the molecule, and therefore can form a bond by a reaction with twice the amount of the reactive group without cleavage of the main chain of the polymer. Accordingly, the carboxylic anhydride group present at an end of the polymer forms a bond with two blocks of the polyether monool (b1-1) to provide a block polymer having a branched structure.

In the above description, exemplary combinations of the hydrophobic polymer (a) and the hydrophilic polymer (b) for obtaining the block polymers (X) having various structures are mentioned. As described above, the hydrophobic polymer (a) and the hydrophilic polymer (b) have various kinds of functional groups, and therefore any combination thereof can be employed as long as the functional group of the hydrophobic polymer (a) and the functional group of the hydrophilic polymer (b) are reactive with each other.

The block polymer (X) preferably has a structure in which a block of the hydrophobic polymer (a) (preferably, the polyolefin (a1)) and a block of the hydrophilic polymer (b) (preferably, the polyether (b1) or the polyether-containing hydrophilic polymer (b2)) are bonded via an ester bond, an amide bond, an ether bond, an imide bond, a urethane bond, or a urea bond, from the standpoint of the heat resistance and ease of production, more preferably via an ester bond or an imide bond, particularly preferably via an ester bond.

The block polymer (X) has a Mn of preferably 3,000 to 14,000, more preferably 4,000 to 11,000, particularly preferably 5,000 to 8,000 from the standpoint of the mechanical properties, wettability modification, and improvement of adhesion (improvement of coatability) of the molding described later.

The weight ratio [($\alpha_b$)/($\alpha_X$)] of the block of the hydrophilic polymer (b) to the block polymer (X) is preferably 20 to 60% by weight, more preferably 25 to 50% by weight, particularly preferably 30 to 40% by weight from the standpoint of the mechanical properties, wettability modification, and improvement of adhesion (improvement of coatability) of the molding and the dispersibility of the block polymer (X) in the resin composition (Z).

In the case where the block polymer (X) has a structure in which a block of the hydrophobic polymer (a) and a block of the hydrophilic polymer (b) are bonded via an ester bond, an amide bond, an ether bond, or an imide bond, such a block polymer (X) can be produced, for example, by charging the hydrophobic polymer (a) and the hydrophilic polymer (b) into a reaction vessel, reacting the mixtures with stirring at a reaction temperature of 100° C. to 250° C. at a pressure of 0.003 to 0.1 MPa for 1 to 50 hours while removing water generated in amidation, esterification, or imidization (hereafter, abbreviated as generated water) from the reaction system.

In the case of esterification, 0.05 to 0.5% by weight of a catalyst based on the weight of the hydrophobic polymer (a) and the hydrophilic polymer (b) is preferably used for promotion of the reaction. Examples of the catalyst include inorganic acids (e.g., sulfuric acid, hydrochloric acid), organic sulfonic acids (e.g., methanesulfonic acid, paratoluene sulfonic acid, xylene sulfonic acid, naphthalene sulfonic acid), antimony catalysts (e.g., antimony trioxide), tin catalysts (e.g., monobutyl tin oxide, dibutyl tin oxide), titanium catalysts (e.g., tetrabutyl titanate, bistriethanolamine titanate, titanium potassium oxalate), zirconium catalysts (e.g., tetrabutyl zirconate, zirconyl acetate), and zinc catalysts (e.g., zinc acetate). In the case of using a catalyst, after the esterification, the catalyst may be, if needed, neutralized, and removed for purification by treatment with an absorber.

The generated water can be removed from the reaction system, for example, by any of the following methods:

[1] a method of using an organic solvent (e.g., toluene, xylene, cyclohexane) not compatible with water and azeotropically boiling the organic solvent and the generated water under reflux, thereby removing the generated water alone from the reaction system;

[2] a method of blowing a carrier gas (e.g., air, nitrogen, helium, argon, carbon dioxide) into the reaction system, thereby removing the generated water from the reaction system together with the carrier gas; and

[3] a method of reducing the pressure inside the reaction system, thereby removing the generated water from the reaction system.

In the case where the block polymer (X) has a structure in which a block of the hydrophobic polymer (a) and a block of the hydrophilic polymer (b) are bonded via a urethane bond or a urea bond, the block polymer (X) can be produced, for example, by charging the hydrophilic polymer (b) into a reaction vessel, heating the hydrophilic polymer (b) to 30° C. to 100° C. with stirring, charging the hydrophobic polymer (a) thereto, and reacting them at the same temperature for 1 to 20 hours.

For promotion of the reaction, 0.001 to 5% by weight of a catalyst based on the weight of the hydrophobic polymer (a) and the hydrophilic polymer (b) is preferably used. Examples of the catalyst include organic metal compounds (dibutyl tin dilaurate, dioctyl tin dilaurate, lead octanate, bismuth octanate), tertiary amines (triethylenediamine, trialkyl amine having a C1-C8 alkyl group (e.g., trimethylamine, tributylamine, trioctylamine), diazabicycloalkenes (e.g., 1,8-diazabicyclo[5,4,0]undecene-7)), and combinations of two or more of these.

<Resin Modifier (Y)>

The resin modifier (Y) of the present invention contains the block polymer (X) described above. The resin modifier (Y) can impart excellent wettability and adhesion (improvement of coatability) to coating compositions, printing ink, and adhesives to a thermoplastic resin without impairing the mechanical properties thereof.

As above, the resin modifier (Y) can be suitably used as a resin modifier for a thermoplastic resin (C) described later.

The resin modifier (Y) can contain additives (D) such as a colorant (D1), a mold release agent (D2), an antioxidant (D3), a flame retardant (D4), an ultraviolet absorber (D5), an antibacterial agent (D6), a compatibilizer (D7), a filler (D8), and a transesterification inhibitor (D9) described later.

Examples of the colorant (D1) include inorganic pigments (e.g., white pigments, cobalt compounds, iron compounds, sulfides), organic pigments (e.g., azo pigments, polycyclic pigments), and dye (e.g., azo dye, indigoide dye, sulfur dye, alizarine rye, acridine dye, thiazole dye, nitro dye, aniline dye).

Examples of the mold release agent (D2) include lower (C1-C4) alcohol esters of higher fatty acids (e.g., butyl stearate), polyhydric (dihydric to tetrahydric, or higher) alcohol esters of fatty acids (C2-C18) (e.g., hydrogenated castor oil), glycol (C2-C8) esters of fatty acids (C2-C18) (e.g., ethylene glycol monostearate), and liquid paraffin.

Examples of the antioxidant (D3) include phenol compounds (e.g., monocyclic phenols (e.g., 2,6-di-t-butyl-p-cresol), bisphenols (e.g., 2,2'-methylenebis(4-methyl-6-t-butylphenol)), polycyclic phenols (e.g., 1,3,5-trimethyl-2,4,6-tris(3,5-di-t-butyl-4-hydroxybenzyl)benzene), sulfur compounds (e.g., dilauryl 3,3'-thiodipropionate), phosphor compounds (e.g., triphenyl phosphite), and amine compounds (e.g., octylated diphenylamine).

Examples of the flame retardant (D4) include halogen-containing flame retardants, nitrogen-containing flame retardants, sulfur-containing flame retardants, silicon-containing flame retardants, and phosphor-containing flame retardants.

Examples of the ultraviolet absorber (D5) include benzotriazoles (e.g., 2-(2'-hydroxy-5'-methylphenyl)benzotriazole), benzophenones (e.g., 2-hydroxy-4-methoxybenzophenone), salicylates (e.g., phenyl salicylate), and acrylates (e.g., 2-ethylhexyl-2-cyano-3,3-diphenyl acrylate).

Examples of the antibacterial agent (D6) include benzoic acid, sorbic acid, halogenated phenols, organic iodine, nitriles (e.g., 2,4,5,6-tetrachloroisophthalonitrile), thiocyano (methylene biscyanocyanate), N-haloalkyl thioimide, copper agents (e.g., copper 8-quinolate), benzimidazole, benzothiazole, trihaloallyl, triazole, organic nitrogen sulfur compounds (e.g., SLAOFF 39), quaternary ammonium compounds, and pyridine compounds.

Examples of the compatibilizer (D7) include modified vinyl polymers having at least one functional group (polar group) selected from the group consisting of a carboxyl group, an epoxy group, an amino group, a hydroxyl group, and a polyoxyalkylene group: for example, polymers disclosed in JP H03-258850 A, and modified vinyl polymers having a sulfonic acid group and block polymers having a polyolefin part and an aromatic vinyl polymer part disclosed in JP H06-345927 A.

Examples of the filler (D8) include inorganic fillers (e.g., calcium carbonate, talc, clay) and organic fillers (e.g., urea, calcium stearate).

Examples of the transesterification inhibitor (D9) include phosphoric acid esters (e.g., bisphenol A bis(diphenyl phosphate), monooctadecyl phosphate, dioctadecyl phosphate), and phosphorous acid esters (e.g., tris(2,4-di-t-butyl phenyl) phosphite).

The total amount of the additives (D) based on the weight of the thermoplastic resin (C) is commonly 45% by weight or less, preferably 0.001 to 40% by weight, more preferably 0.01 to 35% by weight from the standpoint of the effect of each additive and the mechanical properties of the molding. Concerning the amount of each additive (D), from the same standpoint, the amount of the colorant (D1) is preferably 0.1 to 3% by weight, more preferably 0.2 to 2% by weight; the amount of the mold release agent (D2) is preferably 0.01 to 3% by weight, more preferably 0.05 to 1% by weight; the amount of the antioxidant (D3) is preferably 0.01 to 3% by weight, more preferably 0.05 to 1% by weight; the amount of the flame retardant (D4) is preferably 0.5 to 20% by weight, more preferably 1 to 10% by weight; the amount of the ultraviolet absorber (D5) is preferably 0.01 to 3% by weight, more preferably 0.05 to 1% by weight; the amount of the antibacterial agent (D6) is preferably 0.5 to 20% by weight, more preferably 1 to 10% by weight; the amount of the compatibilizer (D7) is preferably 0.5 to 10% by weight, more preferably 1 to 5% by weight; the amount of the filler (D8) is preferably 0.5 to 10% by weight, more preferably 1 to 5% by weight; and the amount of the transesterification inhibitor (D9) is preferably 0.01 to 3% by weight, more preferably 0.05 to 1% by weight.

<Resin Composition (Z)>

The resin composition (Z) of the present invention contains the resin modifier (Y) of the present invention and a thermoplastic resin (C).

The weight ratio [$(\alpha_Y):(\alpha_C)$] between the resin modifier (Y) and the thermoplastic resin (C) is preferably 1:99 to 50:50, more preferably 5:95 to 20:80, particularly preferably 10:90 to 15:85 from the standpoint of the mechanical properties, and the wettability modification, improvement of adhesion (improvement of coatability), and persistence of these effects.

<Thermoplastic Resin (C)>

Examples of the thermoplastic resin (C) include a polyolefin resin (C1) (e.g., polypropylene (PP), ethylene/propylene copolymers, polyethylene (PE)); a fluororesin (C2) (e.g., PTFE (polytetrafluoroethylene), ETFE (an ethylene-tetrafluoroethylene copolymer), PFA (perfluoroalkoxy alkane (a copolymer of ethylene tetrafluoride ($C_2F_4$) and perfluoroalkoxyethylene)), PVDF (a polyvinylidene fluoride resin)); a polystyrene resin (C3) (a copolymer containing, as a constitutional unit, at least one selected from the group consisting of a vinyl group-containing aromatic hydrocarbon alone and a vinyl group-containing aromatic hydrocarbon with butadiene; e.g., polystyrene (PS), impact-resistant polystyrene); and mixtures of two or more types of these.

Among these, preferred are the polyolefin resin (C1) and PVDF among the fluororesins (C2), more preferred is the polyolefin resin (C1), particularly preferred is a polypropylene (homo-type polypropylene, block-type polypropylene, and an ethylene propylene copolymer) among the polyolefin resins (C1), and most preferred is homo-type polypropylene from the standpoint of the mechanical properties, the wettability modification, improvement of adhesion (improvement of coatability), and persistence of these effects of the molding described later.

The resin composition (Z) may contain additives (D) such as a colorant (D1), a mold release agent (D2), an antioxidant (D3), a flame retardant (D4), an ultraviolet absorber (D5), an antibacterial agent (D6), a compatibilizer (D7), a filler (D8), and a transesterification inhibitor (D9), if needed, within a range that the effects of the present invention are not impaired. Each additive may be used alone or in combination of two or more thereof.

The resin composition (Z) of the present invention is obtainable by melt-mixing the resin modifier (Y) of the present invention, the thermoplastic resin (C), and, if needed, the additives (D).

At this time, the same additives (D) as those contained in the resin modifier (Y) may be added to the resin composition (Z).

The melt-mixing method may be a method of mixing commonly pelletized or powdered ingredients in an appropriate mixer (e.g., Henschel mixer) and then melt-mixing the mixture in an extruder for pelletization.

The ingredients may be added in any order upon melt-mixing. For example,

[1] the thermoplastic resin (C) and the resin modifier (Y) are melt-mixed first, and then the additives (D), if needed, are charged at once and melt-mixed; or

[2] upon melt-mixing of the thermoplastic resin (C) and the resin modifier (Y), part of the thermoplastic resin (C) is melt-mixed in advance to prepare a high-concentration composition (masterbatch resin composition) of the resin modifier (Y), and then the rest of the thermoplastic resin (C) and the additives (D), if needed, are melt-mixed (a masterbatch method or a masterpellet method).

In the method [2], the concentration of the resin modifier (Y) in the masterbatch resin composition is preferably 20 to 80% by weight, more preferably 50 to 70% by weight.

Of the methods [1] and [2], the method [2] is preferred from the standpoint that the resin modifier (Y) is efficiently dispersed in the thermoplastic resin (C).

<Molding>

The molding of the present invention is obtained by molding the resin composition (Z) of the present invention. Examples of the molding method include injection molding, compression molding, calender molding, slush molding, rotational molding, extrusion molding, blow molding, and film molding (e.g., casting method, tenter method, inflation method). Any method using a technique such as single-layer molding, multilayer molding, or foam molding according to the purpose may be employed for molding.

The molding of the present invention has excellent mechanical properties, and wettability, adhesion (coatability), and persistence of these properties, as well as favorable coatability and printability. Coating and/or printing is performed on the molding to prepare a molded article.

The method of coating the molding may be, but not limited to, air spray coating, airless spray coating, electrostatic spray coating, dip coating, roller coating, or brush coating.

The coating composition may be those commonly used for coating of plastic objects. Specific examples thereof include polyester melamine resin coating compositions, epoxy melamine resin coating compositions, acrylic melamine resin coating compositions, and acrylic urethane resin coating compositions.

The coating thickness (dry thickness) may be determined as appropriate according to the purpose. Yet, it is preferably 10 to 50 μm.

Printing on a molding or a coated surface of the molding may be performed by any printing method commonly employed for printing on plastic objects. Examples thereof include gravure printing, flexographic printing, screen printing, pad printing, dry offset printing, and offset printing.

The printing ink may be one commonly used for printing on plastic objects. Examples thereof include gravure ink, flexographic ink, screen ink, pad ink, dry offset ink, and offset ink.

The resin modifier (Y) of the present invention is used as a wettability modifier and/or a coatability improver.

The molding of the present invention containing the resin modifier (Y) has excellent wettability, and therefore, the resin modifier (Y) is also suitably used for the following uses: improvement of wettability of PP for battery separators; improvement of wettability of PE or PVDF for water treatment membranes; improvement of wettability of polyolefin short fiber for fiber reinforcement; improvement of wettability of plastic greenhouses; and improvement of wettability of food packaging films.

EXAMPLE

Examples of the present invention are described below, but the present invention is not limited to these examples. In the following description, "parts" means "parts by weight".

<Production Example 1> [One End-Acid Modified Ethylene-Propylene Random Copolymer (a-1)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=33 mol %) at 410±0.1° C. under nitrogen aeration (80 mL/min.) for 16 minutes, Mn: 3,900, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a one end-acid modified ethylene-propylene random copolymer (a-1) having a carboxylic anhydride group at one end of the polymer was obtained.

The one end-acid modified ethylene-propylene random copolymer (a-1) had a Mn of 4,000, a propylene content of 33 mol %, an isotacticity at a propylene part of 40%, and a water absorption (24 hours) of 0.03%.

<Production Example 2> [One End-Acid Modified Ethylene-Propylene Random Copolymer (a-2)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=52 mol %) at 410±0.1° C. under nitrogen aeration (80 mL/min.) for 16 minutes, Mn: 3,900, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a one end-acid modified ethylene-propylene random copolymer (a-2) having a carboxylic anhydride group at one end of the polymer was obtained.

The one end-acid modified ethylene-propylene random copolymer (a-2) had a Mn of 4,000, a propylene content of 52 mol %, an isotacticity at a propylene part of 60%, and a water absorption (24 hours) of 0.03%.

<Production Example 3> [One End-Acid Modified 1-Butene-Propylene Random Copolymer (a-3)]

A stainless-steel pressure-resistant reaction vessel equipped with a stirrer, a thermometer, a heating and cooling device, a nitrogen introduction tube, and a decompression device was charged with 90 parts of a low-molecular-weight 1-butene-propylene random copolymer obtained by thermal degradation (obtained by thermal degradation of a 1-butene-propylene random copolymer (propylene content=82 mol %) at 410±0.1° C. under nitrogen aeration (80 mL/min.) for 16 minutes, Mn: 3,900, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a one end-acid modified 1-butene-propylene random copolymer (a-3) having a carboxylic anhydride group at one end of the polymer was obtained.

The one end-acid modified 1-butene-propylene random copolymer (a-3) had a Mn of 4,000, a propylene content of 82 mol %, an isotacticity at a propylene part of 80%, and a water absorption (24 hours) of 0.03%.

<Production Example 4> [One End-Acid Modified Ethylene-Propylene Random Copolymer (a-4)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 3,900, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a one end-acid modified ethylene-propylene random copolymer (a-4) having a carboxylic anhydride group at one end of the polymer was obtained.

The one end-acid modified ethylene-propylene random copolymer (a-4) had a Mn of 4,000, a propylene content of 96 mol %, an isotacticity at a propylene part of 90%, and a water absorption (24 hours) of 0.02%.

<Production Example 5> [One End-Acid Modified Homogeneous Polypropylene (a-5)]

A stainless-steel pressure-resistant reaction vessel equipped with a stirrer, a thermometer, a heating and cooling device, a nitrogen introduction tube, and a decompression device was charged with 90 parts of low-molecular-weight homogeneous polypropylene obtained by thermal degradation (obtained by thermal degradation of homogeneous polypropylene at 410±0.1° C. under nitrogen aeration (80 mL/min.) for 16 minutes, Mn: 3,900, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of one end-acid modified homogeneous propylene (a-5) having a carboxylic anhydride group at one end of the polymer was obtained.

The one end-acid modified homogeneous propylene (a-5) had a Mn of 4,000, a propylene content of 100 mol %, an isotacticity at a propylene part of 99%, and a water absorption (24 hours) of 0.01%.

<Production Example 6> [Each End-Acid Modified Ethylene-Propylene Random Copolymer (a-6)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 3,900, average number of double bonds per molecule: 2.0), 20 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of an each end-acid modified ethylene-propylene random copolymer (a-6) having a carboxylic anhydride group at each end of the polymer was obtained.

The each end-acid modified ethylene-propylene random copolymer (a-6) had a Mn of 4,000, a propylene content of 96 mol %, an isotacticity at a propylene part of 90%, and a water absorption of (24 hours) of 0.02%.

<Production Example 7> [One End-Acid Modified Ethylene-Propylene Random Copolymer (a-7)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 1,400, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a one end-acid modified ethylene-propylene random copolymer (a-7) having a carboxylic anhydride group at one end of the polymer was obtained.

The one end-acid modified ethylene-propylene random copolymer (a-7) had a Mn of 1,500, a propylene content of 96 mol %, an isotacticity at a propylene part of 90%, and a water absorption (24 hours) of 0.05%.

<Production Example 8> [One End-Acid Modified Ethylene-Propylene Random Copolymer (a-8)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 2,400, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a one end-acid modified ethylene-propylene random copolymer (a-8) having a carboxylic anhydride group at one end of the polymer was obtained.

The one end-acid modified ethylene-propylene random copolymer (a-8) had a Mn of 2,500, a propylene content of 96 mol %, an isotacticity at a propylene part of 90%, and a water absorption (24 hours) of 0.03%.

<Production Example 9> [One End-Acid Modified Ethylene-Propylene Random Copolymer (a-9)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 10,000, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a one end-acid modified ethylene-propylene random copolymer (a-9) having a carboxylic anhydride group at one end of the polymer was obtained.

The one end-acid modified ethylene-propylene random copolymer (a-9) had a Mn of 10,000, a propylene content of 96 mol %, an isotacticity at a propylene part of 90%, and a water absorption (24 hours) of 0.01%.

<Production Example 10> [Each End-Acid Modified Ethylene-Propylene Random Copolymer (a-10)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 10,000, average number of double bonds per molecule: 2.0), 20 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of an each end-acid modified ethylene-propylene random copolymer (a-10) having a carboxylic anhydride group at each end of the polymer was obtained.

The each end-acid modified ethylene-propylene random copolymer (a-10) had a Mn of 10,000, a propylene content of 96 mol %, an isotacticity at a propylene part of 90%, and a water absorption (24 hours) of 0.02%.

<Production Example 11> [Each End-Acid Modified Ethylene-Propylene Random Copolymer (a-11)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 1,400, average number of double bonds per molecule: 2.0), 20 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of an each end-acid modified ethylene-propylene random copolymer (a-11) having a carboxylic anhydride group at each end of the polymer was obtained.

The each end-acid modified ethylene-propylene random copolymer (a-11) had a Mn of 1,500, a propylene content of 96 mol %, an isotacticity at a propylene part of 90%, and a water absorption (24 hours) of 0.07%.

<Production Example 12> [One End-Amino Group-Modified Ethylene-Propylene Random Copolymer (a-12)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 3,900, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a polyolefin having a carboxylic anhydride group at one end of the polymer was obtained.

Next, a pressure-resistant reaction vessel similar to that of Production Example 1 was charged with 90 parts of the above polyolefin having a carboxylic anhydride group at one end of the polymer and 10 parts of bis(2-aminoethyl)ether. The contents were heated to 200° C. with stirring in a nitrogen gas atmosphere, and reacted at that temperature for two hours. Excessive bis(2-aminoethyl) ether was removed under reduced pressure (0.013 MPa or less) at 200° C. over two hours. Thus, a one end-amino group-modified ethylene-propylene random copolymer (a-12) having an amino group at one end was obtained.

The one end-amino group-modified ethylene-propylene random copolymer (a-12) had a Mn of 4,000, a propylene content of 96 mol %, an isotacticity at a propylene part of 90%, and a water absorption (24 hours) of 0.08%.

<Production Example 13> [One End-Hydroxyl Group-Modified Ethylene-Propylene Random Copolymer (a-13)]

A stainless-steel pressure-resistant reaction vessel equipped with a stirrer, a thermometer, a heating and cooling device, a nitrogen introduction tube, and a decompression device was charged with 90 parts of a low-molecular-weight ethylene-propylene random copolymer obtained by thermal degradation (obtained by thermal degradation of an ethylene-propylene random copolymer (propylene content=96 mol %) at 410±0.1° C. under nitrogen aeration (80 mL/min.) for 16 minutes, Mn: 3,900, average number of double bonds per molecule: 1.0), 10 parts of maleic anhydride, and 30 parts of xylene. The contents were mixed uniformly, followed by nitrogen substitution. The mixture was hermetically heated to 200° C. with stirring to be melted, and reacted at that temperature for ten hours. Then, excessive maleic anhydride and xylene were removed under reduced pressure (0.013 MPa or less) at 200° C. over three hours. Thus, 95 parts of a polyolefin having a carboxylic anhydride group at one end of the polymer was obtained.

Next, a pressure-resistant reaction vessel similar to that of Production Example 1 was charged with 90 parts of the above polyolefin having a carboxylic anhydride group at one end of the polymer and 5 parts of ethanolamine. The contents were heated to 180° C. with stirring in a nitrogen gas atmosphere, and reacted at that temperature for two hours. Excessive ethanolamine was removed under reduced pressure (0.013 MPa or less) at 180° C. over two hours. Thus, a one end-hydroxyl group-modified ethylene-propylene random copolymer (a-13) having a hydroxyl group at one end of the polymer was obtained.

The one end-hydroxyl group-modified ethylene-propylene random copolymer (a-13) had a Mn of 4,000, a propylene content of 96 mol %, an isotacticity at a propylene part of 90%, and a water absorption (24 hours) of 0.08%.

<Production Example 14> [One End-Hydroxyl Group-Modified Alkyl Polyacrylate (a-14)]

A glass 5-L flask equipped with a stirrer, a thermometer, a heating and cooling device, a nitrogen introduction tube, and a decompression device was charged with 1,000 ml of toluene and 10 g of CuBr, followed by blowing of nitrogen into the liquid phase for deoxidation. To the mixture were added 1,000 g of 2-n-tetradecyl-n-heptadecyl (meth)acrylate and 20 g of N-propyl-2-pyridyl methaneimine in nitrogen. They were dissolved uniformly with stirring, followed by blowing of nitrogen into the liquid phase for deoxidation.

After heating of the contents to 90° C., 10 ml of 2-hydroxyethyl 2-bromoisobutyrate was added so that a polymerization reaction was carried out. After eight hours, desolvation was carried out under reduced pressure. Thus, a one end-hydroxyl group-modified alkyl polyacrylate (a-14) having a hydroxyl group at one end of the polymer was obtained.

The one end-hydroxyl group-modified alkyl polyacrylate (a-14) had a Mn of 4,000, a propylene content of 0 mol %, and a water absorption (24 hours) of 0.09%.

<Production Example 15> [Each End-Hydroxyl Group-Modified Cationic Polymer (b3-1)]

A pressure-resistant reaction vessel similar to that of Production Example 1 was charged with 41 parts of N-methyldiethanolamine, 49 parts of adipic acid, and 0.3 parts of zirconyl acetate, followed by nitrogen substitution. The contents were heated to 220° C. over two hours and decompressed to 0.013 MPa over one hour for polyesterification. After completion of the reaction, the contents were cooled to 50° C. and 100 parts of methanol was added and dissolved therein. While the temperature inside the reaction vessel is maintained at 120° C. with stirring, 31 parts of dimethyl carbonate was dropwise added over three hours, and aged at that temperature for six hours. After cooling to room temperature, 100 parts of a 60 wt % hexafluorophosphate aqueous solution was added and stirred at room temperature for one hour. Then, methanol was removed under reduced pressure. Thus, an each end-hydroxyl group-modified cationic polymer (b3-1) having twelve (on average) quaternary ammonium groups was obtained.

The each end-hydroxyl group-modified cationic polymer (b3-1) had a hydroxyl value of 28.1, an acid value of 0.5, a Mn of 4,000, and a water absorption (24 hours) of 1.50%.

<Production Example 16> [Anionic Polymer (b4-1)]

A pressure-resistant reaction vessel similar to that of Production Example 1 was charged with 114 parts of diethylene glycol, 268 parts of sodium salt of dimethyl 5-sulfoisophthalate, and 0.2 parts of dibutyl tin oxide. The contents were heated to 190° C. under reduced pressure of 0.067 MPa, followed by transesterification at that temperature while methanol was removed. Thus, an anionic polymer (b4-1) having six (on average) sodium sulfonate groups in a molecule was obtained. The anionic polymer (b4-1) had a hydroxyl value of 48, an acid value of 0.6, a Mn of 2,000, and a water absorption (24 hours) of 2.10%.

<Production Example 17> [Anionic Polymer (b4-2)]

A pressure-resistant reaction vessel similar to that of Production Example 1 was charged with 67 parts of PEG (Mn: 300, polyethylene glycol), 49 parts of sodium salt of dimethyl 5-sulfoisophthalate, and 0.2 parts of dibutyl tin oxide. The contents were heated to 190° C. under reduced pressure of 0.067 MPa, followed by transesterification at that temperature while methanol was removed. Thus, an anionic polymer (b4-2) having five (on average) sodium sulfonate groups in a molecule was obtained.

The anionic polymer (b4-2) had a hydroxyl value of 28, an acid value of 0.4, a Mn of 4,000, and a water absorption (24 hours) of 1.30%.

Example 1

A reaction vessel equipped with a stirrer, a thermometer, and a heating and cooling device was charged with 100 parts of the one end-acid modified ethylene-propylene random copolymer (a-1) obtained in Production Example 1, 50 parts of polyethylene glycol (Mn=2000) monomethyl ether (b-3) shown in Table 1, and 0.3 parts of an antioxidant "IRGANOX 1010". The contents were heated to 210° C. with stirring, and reacted at that temperature under reduced pressure (0.013 MPa or less) for five hours. Thus, a resin modifier (Y-1) containing a block polymer (X-1) having a Mn of 6,000 was obtained.

Table 1 shows the list of codes and compositions of the raw materials used in examples.

The polyethylene glycol (Mn=2000) mono-2-carboxyethyl monomethyl ether (b-5) in Table 1 is obtained by introducing a 2-carboxy ethyl group into polyethylene glycol (Mn=2,000) monomethyl ether.

The polyethylene glycol (Mn=2000) mono-2-isocyanatoethyl monomethyl ether (b-7) is obtained by reacting polyethylene glycol (Mn=2000) monomethyl ether with ethylene diisocyanate and introducing a 2-isocyanatoethyl group.

The "(ethylene oxide 45 mole adduct)" for (b-8) refers to apart corresponding to polyether in a product obtained by adding poly (45) ethylene oxide to the hydroxyl group in the polyolefin (a-13) in Example 20 described below.

TABLE 1

|   |   | Code | Composition | Water absorption (%) | Production Example |
|---|---|------|-------------|----------------------|--------------------|
| Raw material | (a) | (a-1) | One end-acid modified ethylene-propylene random copolymer (Mn = 4000, propylene content = 33 mol %) | 0.03 | 1 |
|   |   | (a-2) | One end-acid modified ethylene-propylene random copolymer (Mn = 4000, propylene content = 52 mol %) | 0.03 | 2 |
|   |   | (a-3) | One end-acid modified 1-butene-propylene random copolymer (Mn = 4000, propylene content = 82 mol %) | 0.03 | 3 |
|   |   | (a-4) | One end-acid modified ethylene-propylene random copolymer (Mn = 4000, propylene content = 96 mol %) | 0.02 | 4 |
|   |   | (a-5) | One end-acid modified homogeneous propylene (Mn = 4000, propylene content = 100 mol %) | 0.01 | 5 |
|   |   | (a-6) | Both end-acid modified ethylene-propylene random copolymer (Mn = 4000, propylene content = 96 mol %) | 0.02 | 6 |
|   |   | (a-7) | One end-acid modified ethylene-propylene random copolymer (Mn = 1500, propylene content = 96 mol %) | 0.05 | 7 |
|   |   | (a-8) | One end-acid modified ethylene-propylene random copolymer (Mn = 2500, propylene content = 96 mol %) | 0.03 | 8 |
|   |   | (a-9) | One end-acid modified ethylene-propylene random copolymer (Mn = 10000, propylene content = 96 mol %) | 0.01 | 9 |
|   |   | (a-10) | Both end-acid modified ethylene-propylene random copolymer (Mn = 10000, propylene content = 96 mol %) | 0.02 | 10 |
|   |   | (a-11) | Both end-acid modified ethylene-propylene random copolymer (Mn = 1500, propylene content = 96 mol %) | 0.07 | 11 |
|   |   | (a-12) | One end-amino group-modified ethylene-propylene random copolymer (Mn = 4000, propylene content = 96 mol %) | 0.08 | 12 |
|   |   | (a-13) | One end-hydroxyl group-modified ethylene-propylene random copolymer (Mn = 4000 propylene content = 96 mol %) | 0.08 | 13 |
|   |   | (a-14) | One end-hydroxyl group-modified alkyl polyacrylate (Mn = 4000 propylene content = 0 mol %) | 0.09 | 14 |
|   | (b) | (b-1) | Polyethylene glycol (Mn = 500) monomethyl ether | 1.00 | — |
|   |   | (b-2) | Polyethylene glycol (Mn = 1000) monomethyl ether | 0.80 | — |
|   |   | (b-3) | Polyethylene glycol (Mn = 2000) monomethyl ether | 0.50 | — |
|   |   | (b-4) | Polyethylene glycol (Mn = 4000) monomethyl ether | 0.20 | — |

TABLE 1-continued

| Code | Composition | Water absorption (%) | Production Example |
|---|---|---|---|
| (b-5) | Polyethylene glycol (Mn = 2000) mono-2-carboxylethyl monomethyl ether | 0.50 | — |
| (b-6) | Polyethylene glycol (Mn = 2000) mono-2-aminoethyl monomethyl ether | 0.50 | — |
| (b-7) | Polyethylene glycol (Mn = 2000) mono-2-isocyanatoethyl monomethyl ether | 0.50 | — |
| (b-8) | (Ethylene oxide 45 mole adduct) | 0.50 | — |
| (b-9) | Polyethylene glycol (Mn = 2000) monohexyl ether | 0.50 | — |
| (b-10) | Poly(oxymethylene)diol (Mn = 2000) monomethyl ether | 0.50 | — |
| (b-11) | Polypropylene glycol (Mn = 2000) monomethyl ether | 0.30 | — |
| (b-12) | Polybutylene glycol (Mn = 2000) monomethyl ether | 0.20 | — |
| (b-13) | Poly(ethylene oxide/propylene oxide) random copolymer diol (Mn = 2000) monomethyl ether (weight ratio between ethylene oxide and propylene oxide = 80:20) | 0.40 | — |
| (b-14) | Polyethylene glycol (Mn = 2000) | 0.60 | — |
| (b3-1) | Both end-hydroxyl group-modified cationic polymer (Mn = 4000) | 1.50 | 15 |
| (b4-1) | Anionic polymer (Mn = 2000) | 2.10 | 16 |
| (b4-2) | Anionic polymer (Mn = 4000) | 1.30 | 17 |
| (b5-1) | Polyglycerol (Mn = 2000) | 5.30 | — |
| (b6-1) | Polyvinyl alcohol (Mn = 2000) | 5.10 | — |
| (b6-2) | Polyvinyl alcohol (Mn = 4000) | 3.00 | — |

Examples 2 to 19, Examples 21 to 32, Comparative Examples 1 and 2

Resin modifiers (Y-2) to (Y-19), (Y-21) to (Y-32), and (RY-1) were obtained in the same manner as in Example 1, except that the raw materials used and the amount thereof were changed as shown in Table 2 or 3.

A commercially available surfactant (glyceryl monostearate) was used as it was as the resin modifier (RY-2) in Comparative Example 2.

The orientation index (ω) of the resin modifier (RY-2) was determined on the supposition that a carbon chain ($C_{17}H_{35}$) part was the hydrophobic polymer (a) and the remaining part was the hydrophilic polymer (b).

Example 20

An autoclave was charged with 100 parts of the one end-hydroxyl group-modified ethylene-propylene random copolymer (a-13) obtained in Production Example 13 and 1 part of lithium hydroxide monohydrate. After nitrogen substitution, the contents were heated to 150° C. Then, 50 parts of ethylene oxide was dropwise added to be reacted for 24 hours at 130° C. to 150° C. at a reaction pressure of 0.2 MPa or less, thereby adding poly (45) ethylene oxide to a terminal hydroxyl group of the one end-hydroxyl group-modified ethylene-propylene random copolymer (a-13). Thus, a resin modifier (Y-20) containing a block polymer (X-20) having a Mn of 6,000 was obtained.

Tables 2 and 3 show the physical properties and compositions of the resin modifiers (Y-1) to (Y-32) and (RY-1) and (RY-2) obtained in Examples 1 to 32 and Comparative Examples 1 and 2, and the structures (1) to (3) of the block polymers mentioned below. The block polymer of Comparative Example 1 had a multiblock structure represented by $[-(a)-(b)-]_n$ (average number of n is 3).
(1) Linear (a)-(b) diblock structure
(2) Linear (b)-(a)-(b) triblock structure
(3) Branched structure in which two or three blocks of the hydrophilic polymers (b) are bonded to one end of the block of the hydrophobic polymer (a)

TABLE 2

| | | | Example | | | | |
|---|---|---|---|---|---|---|---|
| | | | 1 | 2 | 3 | 4 | 5 |
| | | Resin modifier (Y) | Y-1 | Y-2 | Y-3 | Y-4 | Y-5 |
| | | Block polymer (X) | X-1 | X-2 | X-3 | X-4 | X-5 |
| Raw material (parts) | (a) | (a-1) | 100 | — | — | — | — |
| | | (a-2) | — | 100 | — | — | — |
| | | (a-3) | — | — | 100 | — | — |
| | | (a-4) | — | — | — | 100 | — |
| | | (a-5) | — | — | — | — | 100 |
| | | (a-6) | — | — | — | — | — |
| | | (a-7) | — | — | — | — | — |
| | | (a-8) | — | — | — | — | — |
| | | (a-9) | — | — | — | — | — |
| | | (a-10) | — | — | — | — | — |
| | | (a-11) | — | — | — | — | — |
| | | (a-12) | — | — | — | — | — |
| | | (a-13) | — | — | — | — | — |
| | | (a-14) | — | — | — | — | — |
| | (b) | (b-1) | — | — | — | — | — |
| | | (b-2) | — | — | — | — | — |
| | | (b-3) | 50 | 50 | 50 | 50 | 50 |
| | | (b-4) | — | — | — | — | — |
| | | (b-5) | — | — | — | — | — |
| | | (b-6) | — | — | — | — | — |
| | | (b-7) | — | — | — | — | — |

TABLE 2-continued

|  |  |  |  |  |  |  |
|---|---|---|---|---|---|---|
|  | (b-8) | — | — | — | — | — |
|  | (b-9) | — | — | — | — | — |
|  | (b-10) | — | — | — | — | — |
|  | (b-11) | — | — | — | — | — |
|  | (b-12) | — | — | — | — | — |
|  | (b-13) | — | — | — | — | — |
|  | (b-14) | — | — | — | — | — |
|  | (b3-1) | — | — | — | — | — |
|  | (b4-1) | — | — | — | — | — |
|  | (b4-2) | — | — | — | — | — |
|  | (b5-1) | — | — | — | — | — |
|  | (b6-1) | — | — | — | — | — |
|  | (b6-2) | — | — | — | — | — |
| Composition and physical properties of block polymer (X) | Propylene content in (a) (mol %) | 33 | 52 | 82 | 96 | 100 |
|  | Isotacticity of propylene part of (a) (%) | 40 | 60 | 80 | 90 | 99 |
|  | Structure of block polymer (X) | (1) | (1) | (1) | (1) | (1) |
|  | Mn of block Polymer (X) | 6,000 | 6,000 | 6,000 | 6,000 | 6,000 |
|  | Weight ratio of block of polyether (b) to block polymer (X) (wt %) | 33 | 33 | 33 | 33 | 33 |
|  | Bonding form of (a) and (b) | Ester bond | Ester bond | Ester bond | Ester bond | Ester bond |
|  | Terminal functional group not bonded to (a) of (b) | Methyl | Methyl | Methyl | Methyl | Methyl |
|  | Composition of (b) part | Polyoxyethylene | Polyoxyethylene | Polyoxyethylene | Polyoxyethylene | Polyoxyethylene |
|  | Orientation index (ω) | 4.0 | 2.8 | 2.6 | 2.0 | 2.0 |

|  |  |  | Example | | | | |
|---|---|---|---|---|---|---|---|
|  |  |  | 6 | 7 | 8 | 9 | 10 |
|  | Resin modifier (Y) |  | Y-6 | Y-7 | Y-8 | Y-9 | Y-10 |
|  | Block polymer (X) |  | X-6 | X-7 | X-8 | X-9 | X-10 |
| Raw material (parts) | (a) | (a-1) | — | — | — | — | — |
|  |  | (a-2) | — | — | — | — | — |
|  |  | (a-3) | — | — | — | — | — |
|  |  | (a-4) | — | 100 | — | — | — |
|  |  | (a-5) | — | — | — | — | — |
|  |  | (a-6) | 100 | — | — | — | — |
|  |  | (a-7) | — | — | 100 | — | — |
|  |  | (a-8) | — | — | — | 100 | — |
|  |  | (a-9) | — | — | — | — | 100 |
|  |  | (a-10) | — | — | — | — | — |
|  |  | (a-11) | — | — | — | — | — |
|  |  | (a-12) | — | — | — | — | — |
|  |  | (a-13) | — | — | — | — | — |
|  |  | (a-14) | — | — | — | — | — |
|  | (b) | (b-1) | — | — | 33 | — | — |
|  |  | (b-2) | — | — | — | 40 | — |
|  |  | (b-3) | 100 | 100 | — | — | — |
|  |  | (b-4) | — | — | — | — | 40 |
|  |  | (b-5) | — | — | — | — | — |
|  |  | (b-6) | — | — | — | — | — |
|  |  | (b-7) | — | — | — | — | — |
|  |  | (b-8) | — | — | — | — | — |
|  |  | (b-9) | — | — | — | — | — |
|  |  | (b-10) | — | — | — | — | — |
|  |  | (b-11) | — | — | — | — | — |
|  |  | (b-12) | — | — | — | — | — |
|  |  | (b-13) | — | — | — | — | — |
|  |  | (b-14) | — | — | — | — | — |
|  |  | (b3-1) | — | — | — | — | — |
|  |  | (b4-1) | — | — | — | — | — |
|  |  | (b4-2) | — | — | — | — | — |
|  |  | (b5-1) | — | — | — | — | — |
|  |  | (b6-1) | — | — | — | — | — |
|  |  | (b6-2) | — | — | — | — | — |
| Composition and physical properties of block polymer (X) | Propylene content in (a) (mol %) |  | 96 | 96 | 96 | 96 | 96 |
|  | Isotacticity of propylene part of (a) (%) |  | 90 | 90 | 90 | 90 | 90 |
|  | Structure of block polymer (X) |  | (2) | (3) | (1) | (1) | (1) |
|  | Mn of block Polymer (X) |  | 8,000 | 8,000 | 2,000 | 3,500 | 14,000 |
|  | Weight ratio of block of polyether (b) to block polymer (X) (wt %) |  | 50 | 50 | 25 | 29 | 29 |

TABLE 2-continued

|  |  | | | | | |
|---|---|---|---|---|---|---|
| | Bonding form of (a) and (b) | Ester bond | Ester bond | Ester bond | Ester bond | Ester bond |
| | Terminal functional group not bonded to (a) of (b) | Methyl | Methyl | Methyl | Methyl | Methyl |
| | Composition of (b) part | Polyoxyethylene | Polyoxyethylene | Polyoxyethylene | Polyoxyethylane | Polyoxyothylene |
| | Orientation index (ω) | 9.0 | 13.0 | 5.0 | 2.3 | 1.8 |

| | | | Example | | | |
|---|---|---|---|---|---|---|
| | | | 11 | 12 | 13 | 14 | 15 |
| | Resin modifier (Y) | | Y-11 | Y-12 | Y-13 | Y-14 | Y-15 |
| | Block polymer (X) | | X-11 | X-12 | X-13 | X-14 | X-15 |
| Raw material (parts) | (a) | (a-1) | — | — | — | — | — |
| | | (a-2) | — | — | — | — | — |
| | | (a-3) | — | — | — | — | — |
| | | (a-4) | — | — | 100 | 100 | — |
| | | (a-5) | — | — | — | — | — |
| | | (a-6) | — | — | — | — | — |
| | | (a-7) | — | — | — | — | — |
| | | (a-8) | — | — | — | — | — |
| | | (a-9) | — | 100 | — | — | — |
| | | (a-10) | 100 | — | — | — | — |
| | | (a-11) | — | — | — | — | — |
| | | (a-12) | — | — | — | — | 100 |
| | | (a-13) | — | — | — | — | — |
| | | (a-14) | — | — | — | — | — |
| | (b) | (b-1) | — | — | — | — | — |
| | | (b-2) | — | — | — | — | — |
| | | (b-3) | — | 10 | 25 | — | 133 |
| | | (b-4) | — | — | — | — | — |
| | | (b-5) | 80 | — | — | 50 | — |
| | | (b-6) | — | — | — | — | — |
| | | (b-7) | — | — | — | — | — |
| | | (b-8) | — | — | — | — | — |
| | | (b-9) | — | — | — | — | — |
| | | (b-10) | — | — | — | — | — |
| | | (b-11) | — | — | — | — | — |
| | | (b-12) | — | — | — | — | — |
| | | (b-13) | — | — | — | — | — |
| | | (b-14) | — | — | — | — | — |
| | | (b3-1) | — | — | — | — | — |
| | | (b4-1) | — | — | — | — | — |
| | | (b4-2) | — | — | — | — | — |
| | | (b5-1) | — | — | — | — | — |
| | | (b6-1) | — | — | — | — | — |
| | | (b6-2) | — | — | — | — | — |
| Composition and physical properties of block polymer (X) | Propylene content in (a) (mol %) | | 96 | 96 | 96 | 96 | 96 |
| | Isotacticity of propylene part of (a) (%) | | 90 | 90 | 90 | 90 | 90 |
| | Structure of block polymer (X) | | (2) | (1) | (1) | (1) | (2) |
| | Mn of block Polymer (X) | | 18,000 | 11,000 | 5,000 | 8,000 | 3,500 |
| | Weight ratio of block of polyether (b) to block polymer (X) (wt %) | | 44 | 9 | 20 | 33 | 57 |
| | Bonding form of (a) and (b) | | Ester bond | Ester bond | Ester bond | Ester bond | Ester bond |
| | Terminal functional group not bonded to (a) of (b) | | Methyl | Methyl | Methyl | Methyl | Methyl |
| | Composition of (b) part | | Polyoxyothylene | Polyoxyethylene | Polyoxyethylene | Polyoxyethylene | Polyoxyethylene |
| | Orientation index (ω) | | 6.5 | 1.8 | 2.0 | 1.9 | 8.0 |

| | | | Example | |
|---|---|---|---|---|
| | | | 16 | 17 |
| | Resin modifier (Y) | | Y-16 | Y-17 |
| | Block polymer (X) | | X-16 | X-17 |
| Raw material (parts) | (a) | (a-1) | — | — |
| | | (a-2) | — | — |
| | | (a-3) | — | — |
| | | (a-4) | — | — |
| | | (a-5) | — | — |
| | | (a-6) | — | — |
| | | (a-7) | — | — |
| | | (a-8) | 100 | — |
| | | (a-9) | — | — |
| | | (a-10) | — | — |
| | | (a-11) | — | — |
| | | (a-12) | — | 100 |
| | | (a-13) | — | — |

TABLE 2-continued

| | | | | |
|---|---|---|---|---|
| | | (a-14) | — | — |
| | (b) | (b-1) | — | — |
| | | (b-2) | — | — |
| | | (b-3) | — | — |
| | | (b-4) | 320 | — |
| | | (b-5) | — | 50 |
| | | (b-6) | — | — |
| | | (b-7) | — | — |
| | | (b-8) | — | — |
| | | (b-9) | — | — |
| | | (b-10) | — | — |
| | | (b-11) | — | — |
| | | (b-12) | — | — |
| | | (b-13) | — | — |
| | | (b-14) | — | — |
| | | (b3-1) | — | — |
| | | (b4-1) | — | — |
| | | (b4-2) | — | — |
| | | (b5-1) | — | — |
| | | (b6-1) | — | — |
| | | (b6-2) | — | — |
| Composition and physical properties of block polymer (X) | | Propylene content in (a) (mol %) | 96 | 96 |
| | | Isotacticity of propylene part of (a) (%) | 90 | 90 |
| | | Structure of block polymer (X) | (3) | (1) |
| | | Mn of block Polymer (X) | 10,500 | 6,000 |
| | | Weight ratio of block of polyether (b) to block polymer (X) (wt %) | 76 | 33 |
| | | Bonding form of (a) and (b) | Ester bond | Amide bond |
| | | Terminal functional group not bonded to (a) of (b) | Methyl | Methyl |
| | | Composition of (b) part | Polyoxyethylene | Polyoxyethylene |
| | | Orientation index ($\omega$) | 11.0 | 2.0 |

TABLE 3

| | | | Example | | | | |
|---|---|---|---|---|---|---|---|
| | | | 18 | 19 | 20 | 21 | 22 |
| | Resin modifier (Y) | | Y-18 | Y-19 | Y-20 | Y-21 | Y-22 |
| | Block polymer (X) | | X-18 | X-19 | X-20 | X-21 | X-22 |
| Used material (parts) | (a) | (a-1) | — | — | — | — | — |
| | | (a-2) | — | — | — | — | — |
| | | (a-3) | — | — | — | — | — |
| | | (a-4) | 100 | — | — | 100 | 100 |
| | | (a-5) | — | — | — | — | — |
| | | (a-6) | — | — | — | — | — |
| | | (a-7) | — | — | — | — | — |
| | | (a-8) | — | — | — | — | — |
| | | (a-9) | — | — | — | — | — |
| | | (a-10) | — | — | — | — | — |
| | | (a-11) | — | — | — | — | — |
| | | (a-12) | — | 100 | — | — | — |
| | | (a-13) | — | — | 100 | — | — |
| | | (a-14) | — | — | — | — | — |
| | (b) | (b-1) | — | — | — | — | — |
| | | (b-2) | — | — | — | — | — |
| | | (b-3) | — | — | — | — | — |
| | | (b-4) | — | — | — | — | — |
| | | (b-5) | — | — | — | — | — |
| | | (b-6) | 50 | — | — | — | — |
| | | (b-7) | — | 50 | — | — | — |
| | | (b-8) | — | — | 50 | — | — |
| | | (b-9) | — | — | — | 50 | — |
| | | (b-10) | — | — | — | — | 50 |
| | | (b-11) | — | — | — | — | — |
| | | (b-12) | — | — | — | — | — |
| | | (b-13) | — | — | — | — | — |
| | | (b-14) | — | — | — | — | — |
| | | (b3-1) | — | — | — | — | — |
| | | (b4-1) | — | — | — | — | — |
| | | (b4-2) | — | — | — | — | — |
| | | (b5-1) | — | — | — | — | — |
| | | (b6-1) | — | — | — | — | — |
| | | (b6-2) | — | — | — | — | — |

TABLE 3-continued

| | | | | | | |
|---|---|---|---|---|---|---|
| Composition and physical properties of block polymer (X) | Propylene content in (a) (mol %) | 96 | 96 | 96 | 96 | 96 |
| | Isotacticity of propylene part of (a) (%) | 90 | 60 | 90 | 90 | 90 |
| | Structure of block polymer (X) | (1) | (1) | (1) | (1) | (1) |
| | Mn of block Polymer (X) | 6,000 | 6,000 | 6,000 | 6,000 | 6,000 |
| | Weight ratio of block of polyether (b) to block polymer (X) (wt %) | 33 | 33 | 33 | 33 | 33 |
| | Bonding form of (a) and (b) | Imide bond | Urethane bond | Ester bond | Ester bond | Ester bond |
| | Terminal functional group not bonded to (a) of (b) | Methyl | Methyl | Hydroxyl group | Hexyl | Methyl |
| | Composition of (b) part | Polyoxyethylene | Polyoxyethylene | Polyoxyethylene | Polyoxyethylene | Polyoxyethylene |
| | Orientation index (ω) | 2.0 | 2.0 | 2.0 | 2.0 | 2.0 |

| | | Example | | | | |
|---|---|---|---|---|---|---|
| | | 23 | 24 | 25 | 26 | 27 |
| | Resin modifier (Y) | Y-23 | Y-24 | Y-25 | Y-26 | Y-27 |
| | Block polymer (X) | X-23 | X-24 | X-25 | X-26 | X-27 |
| Raw material (parts) | (a) (a-1) | — | — | — | — | — |
| | (a-2) | — | — | — | 100 | — |
| | (a-3) | — | — | — | — | — |
| | (a-4) | 100 | 100 | 100 | — | 100 |
| | (a-5) | — | — | — | — | — |
| | (a-6) | — | — | — | — | — |
| | (a-7) | — | — | — | — | — |
| | (a-8) | — | — | — | — | — |
| | (a-9) | — | — | — | — | — |
| | (a-10) | — | — | — | — | — |
| | (a-11) | — | — | — | — | — |
| | (a-12) | — | — | — | — | — |
| | (a-13) | — | — | — | — | — |
| | (a-14) | — | — | — | — | — |
| | (b) (b-1) | — | — | — | — | — |
| | (b-2) | — | — | — | — | — |
| | (b-3) | — | — | — | — | — |
| | (b-4) | — | — | — | — | — |
| | (b-5) | — | — | — | — | — |
| | (b-6) | — | — | — | — | — |
| | (b-7) | — | — | — | — | — |
| | (b-8) | — | — | — | — | — |
| | (b-9) | — | — | — | — | — |
| | (b-10) | — | — | — | — | — |
| | (b-11) | 50 | — | — | — | — |
| | (b-12) | — | 50 | — | — | — |
| | (b-13) | — | — | 50 | — | — |
| | (b-14) | — | — | — | — | — |
| | (b3-1) | — | — | — | 100 | — |
| | (b4-1) | — | — | — | — | 50 |
| | (b4-2) | — | — | — | — | — |
| | (b5-1) | — | — | — | — | — |
| | (b6-1) | — | — | — | — | — |
| | (b6-2) | — | — | — | — | — |
| Composition and physical properties of block polymer (X) | Propylene content in (a) (mol %) | 96 | 96 | 96 | 52 | 96 |
| | Isotacticity of propylene part of (a) (%) | 90 | 90 | 90 | 60 | 90 |
| | Structure of block polymer (X) | (1) | (1) | (1) | (1) | (1) |
| | Mn of block Polymer (X) | 8,000 | 6,000 | 6,000 | 8,000 | 8,000 |
| | Weight ratio of block of polyether (b) to block polymer (X) (wt %) | 33 | 33 | 33 | 50 | 33 |
| | Bonding form of (a) and (b) | Ester bond | Ester bond | Ester bond | Ester bond | Ester bond |
| | Terminal functional group not bonded to (a) of (b) | Methyl | Methyl | Methyl | Hydroxyl group | Hydroxyl group |
| | Composition of (b) part | Polyoxyethylene | Polyoxyethylene | Poly(oxyethylane/oxypropylene) | Cationic polymer | Anionic polymer |
| | Orientation index (ω) | 2.0 | 2.0 | 2.0 | 1.8 | 1.8 |

| | | Example | | | | |
|---|---|---|---|---|---|---|
| | | 28 | 29 | 30 | 31 | 32 |
| | Resin modifier (Y) | Y-28 | Y-29 | Y-30 | Y-31 | Y-32 |
| | Block polymer (X) | X-28 | X-29 | X-30 | X-31 | X-32 |
| Raw material (parts) | (a) (a-1) | — | 100 | — | — | — |
| | (a-2) | 100 | — | — | — | — |
| | (a-3) | — | — | — | 100 | — |

TABLE 3-continued

|  |  |  |  |  |  |  |
|---|---|---|---|---|---|---|
|  | (a-4) | — | — | — | — | — |
|  | (a-5) | — | — | 100 | — | — |
|  | (a-6) | — | — | — | — | — |
|  | (a-7) | — | — | — | — | — |
|  | (a-8) | — | — | — | — | — |
|  | (a-9) | — | — | — | — | — |
|  | (a-10) | — | — | — | — | — |
|  | (a-11) | — | — | — | — | — |
|  | (a-12) | — | — | — | — | — |
|  | (a-13) | — | — | — | — | — |
|  | (a-14) | — | — | — | — | — |
| (b) | (b-1) | — | — | — | — | 100 |
|  | (b-2) | — | — | — | — | — |
|  | (b-3) | — | — | — | — | — |
|  | (b-4) | — | — | — | — | — |
|  | (b-5) | — | — | — | — | — |
|  | (b-6) | — | — | — | — | — |
|  | (b-7) | — | — | — | — | — |
|  | (b-8) | — | — | — | — | — |
|  | (b-9) | — | — | — | — | 50 |
|  | (b-10) | — | — | — | — | — |
|  | (b-11) | — | — | — | — | — |
|  | (b-12) | — | — | — | — | — |
|  | (b-13) | — | — | — | — | — |
|  | (b-14) | — | — | — | — | — |
|  | (b3-1) | — | — | — | — | — |
|  | (b4-1) | — | — | — | — | — |
|  | (b4-2) | 100 | — | — | — | — |
|  | (b5-1) | — | 50 | — | — | — |
|  | (b6-1) | — | — | 50 | — | — |
|  | (b6-2) | — | — | — | 100 | — |
| Composition and physical properties of block polymer (X) | Propylene content in (a) (mol %) | 52 | 33 | 100 | 82 | 0 |
|  | Isotacticity of propylene part of (a) (%) | 80 | 40 | 99 | 80 | 0 |
|  | Structure of block polymer (X) | (1) | (1) | (1) | (1) | (1) |
|  | Mn of block Polymer (X) | 8,000 | 6,000 | 6,000 | 8,000 | 6,000 |
|  | Weight ratio of block of polyether (b) to block polymer (X) (wt %) | 50 | 33 | 33 | 50 | 33 |
|  | Bonding form of (a) and (b) | Ester bond | Ester bond | Ester bond | Ester bond | Ester bond |
|  | Terminal functional group not bonded to (a) of (b) | Hydroxyl group | Hydroxyl group | Hydroxyl group | Hydroxyl group | Hydroxyl group |
|  | Composition of (b) part | Anionic polymer | Polyglycerol | Polyvinyl alcohol | Polyvinyl alcohol | Polyoxyethylene |
|  | Orientation index (ω) | 1.6 | 1.5 | 1.7 | 1.6 | 14.5 |

|  |  |  | Comparative Example | |
|---|---|---|---|---|
|  |  |  | 1 | 2 |
|  |  | Resin modifier (Y) | RY-1 | RY-2 |
|  |  | Block polymer (X) | RX-1 | — |
| Raw material (parts) | (a) | (a-1) | — | — |
|  |  | (a-2) | — | — |
|  |  | (a-3) | — | — |
|  |  | (a-4) | — | — |
|  |  | (a-5) | — | — |
|  |  | (a-6) | 100 | — |
|  |  | (a-7) | — | — |
|  |  | (a-8) | — | — |
|  |  | (a-9) | — | — |
|  |  | (a-10) | — | — |
|  |  | (a-11) | — | — |
|  |  | (a-12) | — | — |
|  |  | (a-13) | — | — |
|  |  | (a-14) | — | — |
|  | (b) | (b-1) | — | — |
|  |  | (b-2) | — | — |
|  |  | (b-3) | — | — |
|  |  | (b-4) | — | — |
|  |  | (b-5) | — | — |
|  |  | (b-6) | — | — |
|  |  | (b-7) | — | — |
|  |  | (b-8) | — | — |
|  |  | (b-9) | — | — |
|  |  | (b-10) | — | — |
|  |  | (b-11) | — | — |
|  |  | (b-12) | — | — |
|  |  | (b-13) | — | — |
|  |  | (b-14) | 50 | — |

TABLE 3-continued

|  |  |  |  |
|---|---|---|---|
|  | (b3-1) | — | — |
|  | (b4-1) | — | — |
|  | (b4-2) | — | — |
|  | (b5-1) | — | — |
|  | (b6-1) | — | — |
|  | (b6-2) | — | — |
| Composition and physical properties of block polymer (X) | Propylene content in (a) (mol %) | 96 | — |
|  | Isotacticity of propylene part of (a) (%) | 90 | — |
|  | Structure of block polymer (X) | Multiblock | — |
|  | Mn of block Polymer (X) | 18,000 | — |
|  | Weight ratio of block of polyether (b) to block polymer (X) (wt %) | 33 | — |
|  | Bonding form of (a) and (b) | Ester bond | — |
|  | Terminal functional group not bonded to (a) of (b) | Hydroxyl group | — |
|  | Composition of (b) part | Polyoxyethylene | — |
|  | Orientation index (ω) | 1.1 | 22.0 |

Examples 33 to 73, Comparative Examples 3 to 9

Resin compositions (Z-1) to (Z-41) and (RZ-1) to (RZ-7) were obtained by blending formulation ingredients according to the compounding formulations (by parts) shown in Tables 4 and 5 with a Henschel mixer for three minutes and melt-kneading the mixture in a twin-screw extruder with a vent under the conditions of 100 rpm, 220° C., and a retention time of five minutes.

The details of the thermoplastic resins in Tables 4 and 5 are as below.
- (C-1): Homogeneous polypropylene (product name: "SunAllomer PM900A", product of SunAllomer Ltd.)
- (C-2): Block type polypropylene ("PM771M", product of SunAllomer Ltd.)
- (C-3): Ethylene-propylene copolymer (product name: "SunAllomer PB222A", product of SunAllomer Ltd.)
- (C-4): Polyethylene (product name: "Novatec HJ490", product of Japan Polyethylene Corporation)
- (C-5): Impact-resistant polystyrene resin ("HIPS 433", product of PS Japan Corporation)
- (C-6): Polyvinylidene fluoride resin ("KYNAR741", product of ARKEMA)

From each of the obtained resin compositions, a molding sample was produced using an injection molding machine ("PS40E5ASE", product of Nissei Plastic Industrial Co., Ltd.) at a cylinder temperature of 230° C. and a mold temperature of 50° C., and subjected to the following performance tests. Tables 4 and 5 show the results.

<Performance Test>

(1) Appearance

The appearance of the surface of the sample (80×80×2 mm) was visually observed and evaluated based on the following criteria.
- Good: favorable without abnormalities (similar to a thermoplastic resin containing no resin modifier)
- Poor: surface roughness, blisters, or the like (2) Mechanical Strength (Izod Impact Strength and Flexural Modulus) Lowering Rate The mechanical strength lowering rate when the resin modifier (Y) of the present invention was added to the thermoplastic resin (C) was evaluated based on the Izod impact strength and the flexural modulus. Since the mechanical strength lowering rate differs according to the amount of the added resin modifier (Y), the value obtained by dividing the lowering rate in use of a specified amount of the resin modifier (Y) by the weight percentage of the added resin modifier (Y) was used for the evaluation in order to clarify the lowering rate caused by the kind of the resin modifier (Y).

Specifically, the mechanical strength lowering rate (%/wt %) obtained by the following formula was evaluated based on the criteria below.

[Mechanical strength lowering rate (%/wt %)]={[Mechanical strength before addition]−[Mechanical strength after addition]}/[Mechanical strength before addition]/[weight of added resin modifier]×100(%).

For example, the formula in the case where 10% by weight of the resin modifier (Y) is added to homogeneous polypropylene (Izod impact strength=2.0 J/m) and the Izod impact strength after addition is 1.8 J/m is mentioned below.

[Mechanical strength lowering rate (%/wt %)]=[2.0 (J/m)−1.8 (J/m)]/2.0 (J/m)/10 (wt %)×100(%)= 1.0(%/wt %).

<Evaluation Criteria>
- Excellent: [Lowering rate]≤0.5
- Good: 0.5<[Lowering rate]≤1.5
- Fair: 1.5<[Lowering rate]≤2.5
- Acceptable: 2.5<[Lowering rate]≤5.5
- Poor: 5.5<[Lowering rate]

(2-1) Izod Impact Strength (Unit: J/m)

Measurement was performed in conformity with ASTM D256 Method A (notched, 3.2 mm thickness).

(2-2) Flexural Modulus (Unit: MPa)

Measurement was performed in conformity with ASTM D638.

(3) Wettability (Unit: Dyn/Cm)

The wet tension was measured in conformity with JIS K6768 (1999), thereby evaluating the wettability. When the wet tension is greater, the wettability to coating compositions or adhesives is higher, namely, favorable.

(4) Persistence of Wettability

The sample was immersed in water at 25° C. for 24 hours, and then taken out. The surface of the sample was wiped with a cotton cloth, and the sample was subjected to temperature control in a thermo-hygrostat maintained at a humidity of 50 RH % and a temperature of 23° C. for 24 hours. The wet tension was measured in the same manner as that described above and evaluated based on the following criteria.

<Evaluation Criteria>
- Excellent: The wet tension was not lowered in comparison with the wettability before immersion in water.

Good: The wet tension was lowered by 1 dyn/cm in comparison with the wettability before immersion in water.

Fair: The wet tension was lowered by 2 dyn/cm in comparison with the wettability before immersion in water.

Poor: The wet tension was lowered by 3 dyn/cm or more in comparison with the wettability before immersion in water.

-: The persistence of wettability was not evaluated because the wettability was not changed between before and after addition of the resin modifier to the resin composition and no effect of modifying the wettability was confirmed.

(5) Adhesion to Coating Compositions

Concerning the coatability (wettability and adhesion to coating compositions), the adhesion to a urethane coating composition was evaluated. To a sample (100×100×2 mm) was applied a urethane coating composition with an applicator to a dry thickness of 30 μm. After drying at 80° C. for 30 minutes, a grid peel test using a transparent pressure-sensitive tape was performed to the coated surface in conformity with JIS K 5600-5-6 (1999). The number of squares of the grid from which the coating film was not peeled out of 100 squares was counted, and evaluated based on the following criteria.

Excellent: The number of unpeeled squares was 100
Very good: The number of unpeeled squares was 95 to 99
Good: The number of unpeeled squares was 90 to 94
Fair: The number of unpeeled squares was 81 to 89
Acceptable: The number of unpeeled squares was 50 to 80
Poor: The number of unpeeled squares was 0 to 49

TABLE 4

| | | | | | Example | | | | | |
|---|---|---|---|---|---|---|---|---|---|---|
| | | | | | 33 | 34 | 35 | 36 | 37 | 38 |
| | | Resin composition (Z) | | | Z-1 | Z-2 | Z-3 | Z-4 | Z-5 | Z-6 |
| Compounding composition (Y) (parts) | Resin modifier (Y) | Resin modifier (Y) | (Y-1) | | 10 | — | — | — | — | — |
| | | | (Y-2) | | — | 10 | — | — | — | — |
| | | | (Y-3) | | — | — | 10 | — | — | — |
| | | | (Y-4) | | — | — | — | 10 | — | — |
| | | | (Y-5) | | — | — | — | — | 10 | — |
| | | | (Y-6) | | — | — | — | — | — | 10 |
| | | | (Y-7) | | — | — | — | — | — | — |
| | | | (Y-8) | | — | — | — | — | — | — |
| | | | (Y-9) | | — | — | — | — | — | — |
| | | | (Y-10) | | — | — | — | — | — | — |
| | | | (Y-11) | | — | — | — | — | — | — |
| | | | (Y-12) | | — | — | — | — | — | — |
| | | | (Y-13) | | — | — | — | — | — | — |
| | | | (Y-14) | | — | — | — | — | — | — |
| | | | (Y-15) | | — | — | — | — | — | — |
| | | | (Y-16) | | — | — | — | — | — | — |
| | | | (Y-17) | | — | — | — | — | — | — |
| | | | (Y-18) | | — | — | — | — | — | — |
| | | | (Y-19) | | — | — | — | — | — | — |
| | | | (Y-20) | | — | — | — | — | — | — |
| | | | (Y-21) | | — | — | — | — | — | — |
| | | | (Y-22) | | — | — | — | — | — | — |
| | | | (Y-23) | | — | — | — | — | — | — |
| | | | (Y-24) | | — | — | — | — | — | — |
| | | | (Y-25) | | — | — | — | — | — | — |
| | | | (Y-26) | | — | — | — | — | — | — |
| | | | (Y-27) | | — | — | — | — | — | — |
| | | | (Y-28) | | — | — | — | — | — | — |
| | | | (Y-29) | | — | — | — | — | — | — |
| | | | (Y-30) | | — | — | — | — | — | — |
| | | | (Y-31) | | — | — | — | — | — | — |
| | | | (Y-32) | | — | — | — | — | — | — |
| | | Resin modifier (RY) for comparison | (RY-1) | | — | — | — | — | — | — |
| | | | (RY-2) | | — | — | — | — | — | — |
| | Thermoplastic resin | Homogeneous polypropylene | (C-1) | | — | — | — | — | — | — |
| | | Block-type polypropylene | (C-2) | | 90 | 90 | 90 | 90 | 90 | 90 |
| | | Ethylene/propylene copolymer | (C-3) | | — | — | — | — | — | — |
| | | Polyethylene | (C-4) | | — | — | — | — | — | — |
| | | Impact-resistant polystyrone resin | (C-5) | | — | — | — | — | — | — |
| | | PVDF | (C-6) | | — | — | — | — | — | — |
| Evaluation result | Appearance | | | | Good | Good | Good | Good | Good | Good |
| | Lowering rate of Izod impact strength (%/wt %) | | | | Fair | Good | Good | Excellent | Excellent | Good |
| | Lowering rate of floxural modulus (%/wt %) | | | | Fair | Good | Good | Excellent | Excellent | Good |
| | Wettability (dyn/cm) | | | | 38 | 40 | 40 | 40 | 40 | 40 |
| | Persistence of wettability | | | | Fair | Excellent | Excellent | Excellent | Excellent | Excellent |
| | Adhesion to coating composition | | | | Fair | Very good | Excellent | Excellent | Excellent | Excellent |

TABLE 4-continued

|  |  |  |  | Example | | | | | |
|---|---|---|---|---|---|---|---|---|---|
|  |  |  |  | 39 | 40 | 41 | 42 | 43 | 44 |
|  |  | Resin composition (Z) |  | Z-7 | Z-8 | Z-9 | Z-10 | Z-11 | Z-12 |
| Compounding composition (parts) | Resin modifier (Y) | Resin modifier (Y) | (Y-1) | — | — | — | — | — | — |
|  |  |  | (Y-2) | — | — | — | — | — | — |
|  |  |  | (Y-3) | — | — | — | — | — | — |
|  |  |  | (Y-4) | — | — | — | — | — | — |
|  |  |  | (Y-5) | — | — | — | — | — | — |
|  |  |  | (Y-6) | — | — | — | — | — | — |
|  |  |  | (Y-7) | 10 | — | — | — | — | — |
|  |  |  | (Y-8) | — | 10 | — | — | — | — |
|  |  |  | (Y-9) | — | — | 10 | — | — | — |
|  |  |  | (Y-10) | — | — | — | 10 | — | — |
|  |  |  | (Y-11) | — | — | — | — | 10 | — |
|  |  |  | (Y-12) | — | — | — | — | — | 10 |
|  |  |  | (Y-13) | — | — | — | — | — | — |
|  |  |  | (Y-14) | — | — | — | — | — | — |
|  |  |  | (Y-15) | — | — | — | — | — | — |
|  |  |  | (Y-16) | — | — | — | — | — | — |
|  |  |  | (Y-17) | — | — | — | — | — | — |
|  |  |  | (Y-18) | — | — | — | — | — | — |
|  |  |  | (Y-19) | — | — | — | — | — | — |
|  |  |  | (Y-20) | — | — | — | — | — | — |
|  |  |  | (Y-21) | — | — | — | — | — | — |
|  |  |  | (Y-22) | — | — | — | — | — | — |
|  |  |  | (Y-23) | — | — | — | — | — | — |
|  |  |  | (Y-24) | — | — | — | — | — | — |
|  |  |  | (Y-25) | — | — | — | — | — | — |
|  |  |  | (Y-26) | — | — | — | — | — | — |
|  |  |  | (Y-27) | — | — | — | — | — | — |
|  |  |  | (Y-28) | — | — | — | — | — | — |
|  |  |  | (Y-29) | — | — | — | — | — | — |
|  |  |  | (Y-30) | — | — | — | — | — | — |
|  |  |  | (Y-31) | — | — | — | — | — | — |
|  |  |  | (Y-32) | — | — | — | — | — | — |
|  |  | Resin modifier (RY) for comparison | (RY-1) | — | — | — | — | — | — |
|  |  |  | (RY-2) | — | — | — | — | — | — |
|  | Thermoplastic resin | Homogeneous polypropylene | (C-1) | — | — | — | — | — | — |
|  |  | Block-type polypropylene | (C-2) | 90 | 90 | 90 | 90 | 90 | 90 |
|  |  | Ethylene/propylene copolymer | (C-3) | — | — | — | — | — | — |
|  |  | Polyethylene | (C-4) | — | — | — | — | — | — |
|  |  | Impact-resistant polystyrone resin | (C-5) | — | — | — | — | — | — |
|  |  | PVDF | (C-6) | — | — | — | — | — | — |
| Evaluation result | Appearance |  |  | Good | Good | Good | Good | Good | Good |
|  | Lowering rate of Izod impact strength (%/wt %) |  |  | Fair | Good | Excellent | Excellent | Good | Excellent |
|  | Lowering rate of floxural modulus (%/wt %) |  |  | Fair | Good | Excellent | Excellent | Good | Excellent |
|  | Wettability (dyn/cm) |  |  | 40 | 40 | 40 | 36 | 36 | 36 |
|  | Persistence of wettability |  |  | Excellent | Excellent | Excellent | Fair | Fair | Fair |
|  | Adhesion to coating composition |  |  | Excellent | Excellent | Excellent | Very good | Very good | Fair |

|  |  |  |  | Example | | | | | |
|---|---|---|---|---|---|---|---|---|---|
|  |  |  |  | 45 | 46 | 47 | 48 | 49 | 50 |
|  |  | Resin composition (Z) |  | Z-13 | Z-14 | Z-15 | Z-16 | Z-17 | Z-18 |
| Compounding composition (parts) | Resin modifier (Y) | Resin modifier (Y) | (Y-1) | — | — | — | — | — | — |
|  |  |  | (Y-2) | — | — | — | — | — | — |
|  |  |  | (Y-3) | — | — | — | — | — | — |
|  |  |  | (Y-4) | — | — | — | — | — | — |
|  |  |  | (Y-5) | — | — | — | — | — | — |
|  |  |  | (Y-6) | — | — | — | — | — | — |
|  |  |  | (Y-7) | — | — | — | — | — | — |
|  |  |  | (Y-8) | — | — | — | — | — | — |
|  |  |  | (Y-9) | — | — | — | — | — | — |
|  |  |  | (Y-10) | — | — | — | — | — | — |
|  |  |  | (Y-11) | — | — | — | — | — | — |
|  |  |  | (Y-12) | — | — | — | — | — | — |
|  |  |  | (Y-13) | 10 | — | — | — | — | — |
|  |  |  | (Y-14) | — | 10 | — | — | — | — |
|  |  |  | (Y-15) | — | — | 10 | — | — | — |
|  |  |  | (Y-16) | — | — | — | 10 | — | — |
|  |  |  | (Y-17) | — | — | — | — | 10 | — |
|  |  |  | (Y-18) | — | — | — | — | — | 10 |
|  |  |  | (Y-19) | — | — | — | — | — | — |
|  |  |  | (Y-20) | — | — | — | — | — | — |
|  |  |  | (Y-21) | — | — | — | — | — | — |
|  |  |  | (Y-22) | — | — | — | — | — | — |

TABLE 4-continued

|  |  |  |  |  |  |  |  |  |
|---|---|---|---|---|---|---|---|---|
|  |  |  | (Y-23) | — | — | — | — | — | — |
|  |  |  | (Y-24) | — | — | — | — | — | — |
|  |  |  | (Y-25) | — | — | — | — | — | — |
|  |  |  | (Y-26) | — | — | — | — | — | — |
|  |  |  | (Y-27) | — | — | — | — | — | — |
|  |  |  | (Y-28) | — | — | — | — | — | — |
|  |  |  | (Y-29) | — | — | — | — | — | — |
|  |  |  | (Y-30) | — | — | — | — | — | — |
|  |  |  | (Y-31) | — | — | — | — | — | — |
|  |  |  | (Y-32) | — | — | — | — | — | — |
|  |  | Resin modifier (RY) | (RY-1) | — | — | — | — | — | — |
|  |  | for comparison | (RY-2) | — | — | — | — | — | — |
|  | Thermo- | Homogeneous polypropylene | (C-1) | — | — | — | — | — | — |
|  | plastic | Block-type polypropylene | (C-2) | 90 | 90 | 90 | 90 | 90 | 90 |
|  | resin | Ethylene/propylene copolymer | (C-3) | — | — | — | — | — | — |
|  |  | Polyethylene | (C-4) | — | — | — | — | — | — |
|  |  | Impact-resistant polystyrone resin | (C-5) | — | — | — | — | — | — |
|  |  | PVDF | (C-6) | — | — | — | — | — | — |
| Eval- | Appearance |  |  | Good | Good | Good | Good | Good | Good |
| uation | Lowering rate of Izod impact strength (%/wt %) |  |  | Excellent | Excellent | Good | Fair | Excellent | Excellent |
| result | Lowering rate of floxural modulus (%/wt %) |  |  | Excellent | Excellent | Good | Fair | Excellent | Excellent |
|  | Wettability (dyn/cm) |  |  | 38 | 40 | 40 | 40 | 40 | 40 |
|  | Persistence of wettability |  |  | Good | Excellent | Excellent | Excellent | Excellent | Excellent |
|  | Adhesion to coating composition |  |  | Very good | Excellent | Very good | Very good | Very good | Very good |

|  |  |  |  | Example |  |  |  |  |  |
|---|---|---|---|---|---|---|---|---|---|
|  |  |  |  | 51 | 52 | 53 | 54 | 55 | 56 |
|  | Resin composition (Z) |  |  | Z-19 | Z-20 | Z-21 | Z-22 | Z-23 | Z-24 |
| Com- | Resin | Resin modifier (Y) | (Y-1) | — | — | — | — | — | — |
| pounding | modifier |  | (Y-2) | — | — | — | — | — | — |
| compo- | (Y) |  | (Y-3) | — | — | — | — | — | — |
| sition |  |  | (Y-4) | — | — | — | — | — | — |
| (parts) |  |  | (Y-5) | — | — | — | — | — | — |
|  |  |  | (Y-6) | — | — | — | — | — | — |
|  |  |  | (Y-7) | — | — | — | — | — | — |
|  |  |  | (Y-8) | — | — | — | — | — | — |
|  |  |  | (Y-9) | — | — | — | — | — | — |
|  |  |  | (Y-10) | — | — | — | — | — | — |
|  |  |  | (Y-11) | — | — | — | — | — | — |
|  |  |  | (Y-12) | — | — | — | — | — | — |
|  |  |  | (Y-13) | — | — | — | — | — | — |
|  |  |  | (Y-14) | — | — | — | — | — | — |
|  |  |  | (Y-15) | — | — | — | — | — | — |
|  |  |  | (Y-16) | — | — | — | — | — | — |
|  |  |  | (Y-17) | — | — | — | — | — | — |
|  |  |  | (Y-18) | — | — | — | — | — | — |
|  |  |  | (Y-19) | 10 | — | — | — | — | — |
|  |  |  | (Y-20) | — | 10 | — | — | — | — |
|  |  |  | (Y-21) | — | — | 10 | — | — | — |
|  |  |  | (Y-22) | — | — | — | 10 | — | — |
|  |  |  | (Y-23) | — | — | — | — | 10 | — |
|  |  |  | (Y-24) | — | — | — | — | — | 10 |
|  |  |  | (Y-25) | — | — | — | — | — | — |
|  |  |  | (Y-26) | — | — | — | — | — | — |
|  |  |  | (Y-27) | — | — | — | — | — | — |
|  |  |  | (Y-28) | — | — | — | — | — | — |
|  |  |  | (Y-29) | — | — | — | — | — | — |
|  |  |  | (Y-30) | — | — | — | — | — | — |
|  |  |  | (Y-31) | — | — | — | — | — | — |
|  |  |  | (Y-32) | — | — | — | — | — | — |
|  |  | Resin modifier (RY) | (RY-1) | — | — | — | — | — | — |
|  |  | for comparison | (RY-2) | — | — | — | — | — | — |
|  | Thermo- | Homogeneous polypropylene | (C-1) | — | — | — | — | — | — |
|  | plastic | Block-type polypropylene | (C-2) | 90 | 90 | 90 | 90 | 90 | 90 |
|  | resin | Ethylene/propylene copolymer | (C-3) | — | — | — | — | — | — |
|  |  | Polyethylene | (C-4) | — | — | — | — | — | — |
|  |  | Impact-resistant polystyrone resin | (C-5) | — | — | — | — | — | — |
|  |  | PVDF | (C-6) | — | — | — | — | — | — |
| Eval- | Appearance |  |  | Good | Good | Good | Good | Good | Good |
| uation | Lowering rate of Izod impact strength (%/wt %) |  |  | Excellent | Excellent | Good | Good | Good | Good |
| result | Lowering rate of floxural modulus (%/wt %) |  |  | Excellent | Excellent | Excellent | Good | Good | Good |
|  | Wettability (dyn/cm) |  |  | 40 | 38 | 40 | 36 | 38 | 36 |
|  | Persistence of wettability |  |  | Excellent | Good | Excellent | Fair | Good | Fair |
|  | Adhesion to coating composition |  |  | Very good | Very good | Excellent | Fair | Very good | Fair |

TABLE 5

|  |  |  |  | Example | | | | | |
|---|---|---|---|---|---|---|---|---|---|
|  |  |  |  | 57 | 58 | 59 | 60 | 61 | 62 |
|  |  | Resin composition (Z) |  | Z-25 | Z-26 | Z-27 | Z-28 | Z-29 | Z-30 |
| Com- pounding compo- sition (parts) | Resin modifier (Y) | Resin modifier (Y) | (Y-1) | — | — | — | — | — | — |
|  |  |  | (Y-2) | — | — | — | — | — | — |
|  |  |  | (Y-3) | — | — | — | — | — | — |
|  |  |  | (Y-4) | — | 1 | 5 | 50 | 10 | 10 |
|  |  |  | (Y-5) | — | — | — | — | — | — |
|  |  |  | (Y-6) | — | — | — | — | — | — |
|  |  |  | (Y-7) | — | — | — | — | — | — |
|  |  |  | (Y-8) | — | — | — | — | — | — |
|  |  |  | (Y-9) | — | — | — | — | — | — |
|  |  |  | (Y-10) | — | — | — | — | — | — |
|  |  |  | (Y-11) | — | — | — | — | — | — |
|  |  |  | (Y-12) | — | — | — | — | — | — |
|  |  |  | (Y-13) | — | — | — | — | — | — |
|  |  |  | (Y-14) | — | — | — | — | — | — |
|  |  |  | (Y-15) | — | — | — | — | — | — |
|  |  |  | (Y-16) | — | — | — | — | — | — |
|  |  |  | (Y-17) | — | — | — | — | — | — |
|  |  |  | (Y-18) | — | — | — | — | — | — |
|  |  |  | (Y-19) | — | — | — | — | — | — |
|  |  |  | (Y-20) | — | — | — | — | — | — |
|  |  |  | (Y-21) | — | — | — | — | — | — |
|  |  |  | (Y-22) | — | — | — | — | — | — |
|  |  |  | (Y-23) | — | — | — | — | — | — |
|  |  |  | (Y-24) | — | — | — | — | — | — |
|  |  |  | (Y-25) | 10 | — | — | — | — | — |
|  |  |  | (Y-26) | — | — | — | — | — | — |
|  |  |  | (Y-27) | — | — | — | — | — | — |
|  |  |  | (Y-28) | — | — | — | — | — | — |
|  |  |  | (Y-29) | — | — | — | — | — | — |
|  |  |  | (Y-30) | — | — | — | — | — | — |
|  |  |  | (Y-31) | — | — | — | — | — | — |
|  |  |  | (Y-32) | — | — | — | — | — | — |
|  |  | Resin modifier (RY) for comparison | (RY-1) | — | — | — | — | — | — |
|  |  |  | (RY-2) | — | — | — | — | — | — |
|  | Thermo- plastic resin | Homogeneous polypropylene | (C-1) | — | — | — | — | — | — |
|  |  | Block-type polypropylene | (C-2) | 90 | 99 | 95 | 50 | — | — |
|  |  | Ethylene/propylene copolymer | (C-3) | — | — | — | — | 90 | — |
|  |  | Polyethylene | (C-4) | — | — | — | — | — | 90 |
|  |  | Impact-resistant polystyrone resin | (C-5) | — | — | — | — | — | — |
|  |  | PVDF | (C-6) | — | — | — | — | — | — |
| Eval- uation result | Appearance |  |  | Good | Good | Good | Good | Good | Good |
|  | Lowering rate of Izod impact strength (%/wt %) |  |  | Good | Excellent | Excellent | Fair | Excellent | Excellent |
|  | Lowering rate of floxural modulus (%/wt %) |  |  | Good | Excellent | Excellent | Fair | Excellent | Excellent |
|  | Wettability (dyn/cm) |  |  | 40 | 36 | 38 | 40 | 40 | 40 |
|  | Persistence of wettability |  |  | Good | Fair | Good | Excellent | Excellent | Excellent |
|  | Adhesion to coating composition |  |  | Very good | Fair | Very good | Excellent | Excellent | Excellent |

|  |  |  |  | Example | | | | | |
|---|---|---|---|---|---|---|---|---|---|
|  |  |  |  | 63 | 64 | 65 | 66 | 67 | 68 |
|  |  | Resin composition (Z) |  | Z-31 | Z-32 | Z-33 | Z-34 | Z-35 | Z-36 |
| Com- pounding compo- sition (parts) | Resin modifier (Y) | Resin modifier (Y) | (Y-1) | — | — | — | — | — | — |
|  |  |  | (Y-2) | — | — | — | — | — | — |
|  |  |  | (Y-3) | — | — | — | — | — | — |
|  |  |  | (Y-4) | 10 | 10 | 10 | 5 | — | — |
|  |  |  | (Y-5) | — | — | — | — | — | — |
|  |  |  | (Y-6) | — | — | — | — | — | — |
|  |  |  | (Y-7) | — | — | — | — | — | — |
|  |  |  | (Y-8) | — | — | — | — | — | — |
|  |  |  | (Y-9) | — | — | — | — | — | — |
|  |  |  | (Y-10) | — | — | — | — | — | — |
|  |  |  | (Y-11) | — | — | — | — | — | — |
|  |  |  | (Y-12) | — | — | — | — | — | — |
|  |  |  | (Y-13) | — | — | — | — | — | — |
|  |  |  | (Y-14) | — | — | — | 5 | — | — |
|  |  |  | (Y-15) | — | — | — | — | — | — |
|  |  |  | (Y-16) | — | — | — | — | — | — |
|  |  |  | (Y-17) | — | — | — | — | — | — |
|  |  |  | (Y-18) | — | — | — | — | — | — |
|  |  |  | (Y-19) | — | — | — | — | — | — |
|  |  |  | (Y-20) | — | — | — | — | — | — |
|  |  |  | (Y-21) | — | — | — | — | — | — |
|  |  |  | (Y-22) | — | — | — | — | — | — |

TABLE 5-continued

| | | | | | | | | |
|---|---|---|---|---|---|---|---|---|
| | | | (Y-23) | — | — | — | — | — | — |
| | | | (Y-24) | — | — | — | — | — | — |
| | | | (Y-25) | — | — | — | — | — | — |
| | | | (Y-26) | — | — | — | — | — | — |
| | | | (Y-27) | — | — | — | — | 10 | — |
| | | | (Y-28) | — | — | — | — | — | 10 |
| | | | (Y-29) | — | — | — | — | — | — |
| | | | (Y-30) | — | — | — | — | — | — |
| | | | (Y-31) | — | — | — | — | — | — |
| | | | (Y-32) | — | — | — | — | — | — |
| | Resin modifier (RY) | | (RY-1) | — | — | — | — | — | — |
| | for comparison | | (RY-2) | — | — | — | — | — | — |
| | Thermo- | Homogeneous polypropylene | (C-1) | — | — | — | — | — | — |
| | plastic | Block-type polypropylene | (C-2) | — | — | — | — | 90 | 90 |
| | resin | Ethylene/propylene copolymer | (C-3) | — | — | — | 90 | — | — |
| | | Polyethylene | (C-4) | — | — | — | — | — | — |
| | | Impact-resistant | (C-5) | 90 | — | — | — | — | — |
| | | polystyrone resin | | — | 90 | — | — | — | — |
| | | PVDF | (C-6) | — | — | 90 | — | — | — |
| Eval- | Appearance | | | Good | Good | Good | Good | Good | Good |
| uation | Lowering rate of Izod impact strength (%/wt %) | | | Good | Good | Good | Excellent | Fair | Fair |
| result | Lowering rate of floxural modulus (%/wt %) | | | Good | Good | Good | Excellent | Fair | Fair |
| | Wettability (dyn/cm) | | | 40 | 38 | 38 | 40 | 36 | 36 |
| | Persistence of wettability | | | Excellent | Excellent | Excellent | Excellent | Fair | Good |
| | Adhesion to coating composition | | | Excellent | Excellent | Excellent | Excellent | Fair | Fair |

| | | | | Example | | | | | Comparative Example |
|---|---|---|---|---|---|---|---|---|---|
| | | | | 69 | 70 | 71 | 72 | 73 | 3 |
| | Resin composition (Z) | | | Z-37 | Z-38 | Z-39 | Z-40 | Z-41 | RZ-1 |
| Com- | Resin | Resin modifier (Y) | (Y-1) | — | — | — | — | — | — |
| pounding | modifier | | (Y-2) | — | — | — | — | — | — |
| compo- | (Y) | | (Y-3) | — | — | — | — | — | — |
| sition | | | (Y-4) | — | — | — | — | — | — |
| (parts) | | | (Y-5) | — | — | — | — | — | — |
| | | | (Y-6) | — | — | — | — | — | — |
| | | | (Y-7) | — | — | — | — | — | — |
| | | | (Y-8) | — | — | — | — | — | — |
| | | | (Y-9) | — | — | — | — | — | — |
| | | | (Y-10) | — | — | — | — | — | — |
| | | | (Y-11) | — | — | — | — | — | — |
| | | | (Y-12) | — | — | — | — | — | — |
| | | | (Y-13) | — | — | — | — | — | — |
| | | | (Y-14) | — | — | — | — | — | — |
| | | | (Y-15) | — | — | — | — | — | — |
| | | | (Y-16) | — | — | — | — | — | — |
| | | | (Y-17) | — | — | — | — | — | — |
| | | | (Y-18) | — | — | — | — | — | — |
| | | | (Y-19) | — | — | — | — | — | — |
| | | | (Y-20) | — | — | — | — | — | — |
| | | | (Y-21) | — | — | — | — | — | — |
| | | | (Y-22) | — | — | — | — | — | — |
| | | | (Y-23) | — | — | — | — | — | — |
| | | | (Y-24) | — | — | — | — | — | — |
| | | | (Y-25) | — | — | — | — | — | — |
| | | | (Y-26) | — | — | — | — | — | — |
| | | | (Y-27) | — | — | — | — | — | — |
| | | | (Y-28) | — | — | — | — | — | — |
| | | | (Y-29) | 10 | — | — | — | — | — |
| | | | (Y-30) | — | 10 | — | — | — | — |
| | | | (Y-31) | — | — | 10 | — | — | — |
| | | | (Y-32) | — | — | — | 10 | — | — |
| | Resin modifier (RY) | | (RY-1) | — | — | — | — | 10 | — |
| | for comparison | | (RY-2) | — | — | — | — | — | 10 |
| | Thermo- | Homogeneous polypropylene | (C-1) | — | — | — | — | — | — |
| | plastic | Block-type polypropylene | (C-2) | 90 | 90 | 90 | 90 | 90 | 90 |
| | resin | Ethylene/propylene copolymer | (C-3) | — | — | — | — | — | — |
| | | Polyethylene | (C-4) | — | — | — | — | — | — |
| | | Impact-resistant | (C-5) | — | — | — | — | — | — |
| | | polystyrone resin | | — | — | — | — | — | — |
| | | PVDF | (C-6) | — | — | — | — | — | — |

TABLE 5-continued

| Evaluation result | | | | | | | | | |
|---|---|---|---|---|---|---|---|---|---|
| | Appearance | | | Good | Good | Good | Good | Good | Good |
| | Lowering rate of Izod impact strength (%/wt %) | | | Fair | Fair | Fair | Fair | Fair | Good |
| | Lowering rate of flexural modulus (%/wt %) | | | Fair | Fair | Fair | Fair | Fair | Good |
| | Wettability (dyn/cm) | | | 36 | 36 | 36 | 36 | 36 | 30 |
| | Persistence of wettability | | | Fair | Excellent | Good | Fair | Fair | — |
| | Adhesion to coating composition | | | Fair | Fair | Fair | Fair | Fair | Poor |

|  |  |  |  | Comparative Example |||||| 
|---|---|---|---|---|---|---|---|---|---|
|  |  |  |  | 4 | 5 | 6 | 7 | 8 | 9 |
|  |  | Resin composition (Z) |  | RZ-2 | RZ-3 | RZ-4 | RZ-5 | RZ-6 | RZ-7 |
| Compounding composition (parts) | Resin modifier (Y) | Resin modifier (Y) | (Y-1) | — | — | — | — | — | — |
| | | | (Y-2) | — | — | — | — | — | — |
| | | | (Y-3) | — | — | — | — | — | — |
| | | | (Y-4) | — | — | — | — | — | — |
| | | | (Y-5) | — | — | — | — | — | — |
| | | | (Y-6) | — | — | — | — | — | — |
| | | | (Y-7) | — | — | — | — | — | — |
| | | | (Y-8) | — | — | — | — | — | — |
| | | | (Y-9) | — | — | — | — | — | — |
| | | | (Y-10) | — | — | — | — | — | — |
| | | | (Y-11) | — | — | — | — | — | — |
| | | | (Y-12) | — | — | — | — | — | — |
| | | | (Y-13) | — | — | — | — | — | — |
| | | | (Y-14) | — | — | — | — | — | — |
| | | | (Y-15) | — | — | — | — | — | — |
| | | | (Y-16) | — | — | — | — | — | — |
| | | | (Y-17) | — | — | — | — | — | — |
| | | | (Y-18) | — | — | — | — | — | — |
| | | | (Y-19) | — | — | — | — | — | — |
| | | | (Y-20) | — | — | — | — | — | — |
| | | | (Y-21) | — | — | — | — | — | — |
| | | | (Y-22) | — | — | — | — | — | — |
| | | | (Y-23) | — | — | — | — | — | — |
| | | | (Y-24) | — | — | — | — | — | — |
| | | | (Y-25) | — | — | — | — | — | — |
| | | | (Y-26) | — | — | — | — | — | — |
| | | | (Y-27) | — | — | — | — | — | — |
| | | | (Y-28) | — | — | — | — | — | — |
| | | | (Y-29) | — | — | — | — | — | — |
| | | | (Y-30) | — | — | — | — | — | — |
| | | | (Y-31) | — | — | — | — | — | — |
| | | | (Y-32) | — | — | — | — | — | — |
| | | Resin modifier (RY) for comparison | (RY-1) | — | — | — | — | — | — |
| | | | (RY-2) | 10 | 10 | 10 | 10 | 10 | — |
| | Thermoplastic resin | Homogeneous polypropylene | (C-1) | — | — | — | — | — | 10 |
| | | Block-type polypropylene | (C-2) | — | — | — | — | — | 90 |
| | | Ethylene/propylene copolymer | (C-3) | 90 | — | — | — | — | — |
| | | Polyethylene | (C-4) | — | 90 | — | — | — | — |
| | | Impact-resistant polystyrone resin | (C-5) | — | — | 90 | — | — | — |
| | | | | — | — | — | 90 | — | — |
| | | PVDF | (C-6) | — | — | — | — | 90 | — |
| Evaluation result | Appearance | | | Good | Good | Good | Good | Good | Poor |
| | Lowering rate of Izod impact strength (%/wt %) | | | Acceptable | Acceptable | Acceptable | Acceptable | Acceptable | Poor |
| | Lowering rate of flexural modulus (%/wt %) | | | Acceptable | Acceptable | Acceptable | Acceptable | Acceptable | Poor |
| | Wettability (dyn/cm) | | | 31 | 30 | 30 | 33 | 26 | 36 |
| | Persistence of wettability | | | — | — | — | — | — | Poor |
| | Adhesion to coating composition | | | Poor | Poor | Poor | Poor | Poor | Poor |

Tables 4 and 5 show that the resin modifiers of the present invention can impart excellent wettability and persistence thereof, and adhesion to a thermoplastic resin without impairing the mechanical properties thereof, in comparison with those of the comparative examples.

INDUSTRIAL APPLICABILITY

The resin modifier (Y) of the present invention can impart excellent wettability (in particular persistent wettability), adhesion (coatability), and persistence of these properties to a thermoplastic resin molding without impairing its mechanical strength or favorable appearance, and therefore is particularly useful as a wettability modifier and/or a coatability improver. Since the resin modifier (Y) can improve the wettability, it is suitably used for improvement of wettability of PP for battery separators, improvement of wettability of PE or PVDF for water treatment membranes, improvement of wettability of polyolefin short fiber for fiber reinforcement, improvement of wettability of plastic greenhouses, and improvement of wettability of food packaging films.

The resin composition (Z) of the present invention has favorable coatability and printability, and therefore is widely usable as a material for Housing Products (e.g., home electrical appliances, office automation equipment, gaming machines, business machines), plastic containers (e.g., trays used in cleanrooms (e.g., IC tray), other containers), various cushioning materials, coating materials (e.g., packaging films, protection films), flooring sheets, artificial grass, mats, tape substrates (for semiconductor production process, for example), and various moldings (e.g., automobile parts) produced by various molding methods (e.g., injection molding, compression molding, calender molding, slush molding, rotational molding, extrusion molding, blow molding, foam molding, film molding (e.g., casting method, tenter method, inflation method)) and is significantly useful.

The molding of the present invention has excellent mechanical properties and excellent wettability, as well as favorable coatability and printability. The molding subjected to coating and/or printing can provide a molded article having favorable adhesion to coating films or the like.

The molded article of the present invention has favorable adhesion to coating films or the like.

The invention claimed is:

1. A resin modifier (Y) comprising:
a block polymer (X) that has a block of a hydrophobic polymer (a) and a block of a hydrophilic polymer (b) as constitutional units,
the block polymer (X) having an orientation index ($\omega$) obtained by the following formula of 1.5 to 15:

orientation index ($\omega$)=($\beta$)/($\alpha$), wherein ($\alpha$) represents a weight ratio [($\alpha_b$)/($\alpha_a$)] between the hydrophilic polymer (b) and the hydrophobic polymer (a) in the block polymer (X), and
($\beta$) represents a weight ratio [($\beta_b$)/($\beta_a$)] between the hydrophilic polymer (b) and the hydrophobic polymer (a) determined by reflective infrared spectroscopy of the block polymer (X) heat-melted and pressed to a thickness of 500 μm, and
wherein the hydrophobic polymer (a) is a polyolefin (a2),
the polyolefin (a2) is an ethylene-propylene copolymer having a reactive group at one end and having 30 mol % or more and 96 mol % or less of a propylene-derived constitutional unit,
the hydrophilic polymer (b) is a polyether (b1), and
the polyether (b1) is at least one selected from the group consisting of a polyether monool (b1-1), a polyether monoamine (b1-2) and a modified product of either one of these (b1-3),
the polyether monool (b1-1) is a polyether monool represented by the formula (1):

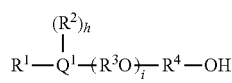

(1)

wherein $R^1$ and $R^2$ are each independently a C1-C12 hydrocarbon group; $Q^1$ is an oxygen atom or a nitrogen atom; h is 0 when $Q^1$ is an oxygen atom and h is 1 when $Q^1$ is a nitrogen atom; $R^3$ and $R^4$ are each independently a $C_1$-$C_4$ alkylene group; ($R^3O$)s may be the same as or different from each other and the bonding form thereof may be a block form or a random form; and i is an integer of 10 to 250, and the polyether monoamine (b1-2) is a polyether monoamine represented by the formula (2):

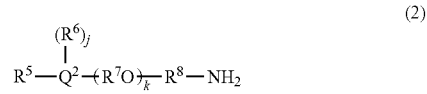

wherein $R^5$ and $R^6$ are each independently a C1-C12 hydrocarbon group; $Q^2$ is an oxygen atom or a nitrogen atom; j is 0 when $Q^2$ is an oxygen atom and j is 1 when $Q^2$ is a nitrogen atom; $R^7$ is a $C_1$-$C_4$ alkylene group; $R^8$ is a C2-C4 alkylene group; ($R^7O$)s may be the same as or different from each other and the bonding form thereof may be a block form or a random form; and k is an integer of 10 to 250.

2. The resin modifier according to claim 1,
wherein the block polymer (X) has the molecular structure (1) or (3):
(1) a linear (a)-(b) diblock structure; or
(3) a branched structure in which two or three blocks of the hydrophilic polymer (b) are bonded to one end of the block of the hydrophobic polymer (a).

3. The resin modifier according to claim 1,
wherein the polyolefin (a2) has a propylene part having an isotacticity of 90% to 100%.

4. The resin modifier according to claim 1,
wherein the block polymer (X) has a number average molecular weight of 3,000 to 14,000.

5. The resin modifier according to claim 1,
wherein the weight ratio [(ab)/(ax)] of the block of the hydrophilic polymer (b) to the block polymer (X) is 20 to 60% by weight.

6. The resin modifier according to claim 1,
wherein the block polymer (X) comprises a block of the hydrophobic polymer (a) and a block of the hydrophilic polymer (b) bonded to each other via an ester bond, an amide bond, an ether bond, an imide bond, a urethane bond, or a urea bond.

7. A resin composition (Z) comprising
the resin modifier (Y) according to claim 1; and
a thermoplastic resin (C).

8. The resin composition according to claim 7,
wherein the thermoplastic resin (C) is a polyolefin.

9. The resin composition according to claim 7,
wherein the weight ratio [($\alpha_Y$):($\alpha_C$)] between the resin modifier (Y) and the thermoplastic resin (C) is 1:99 to 50:50.

10. A molding produced by molding the resin composition (Z) according to claim 7.

11. A molded article produced by performing at least one treatment selected from the group consisting of coating, printing, and application of an adhesive to the molding according to claim 10.

* * * * *